(12) United States Patent
Rogowski et al.

(10) Patent No.: US 9,275,046 B2
(45) Date of Patent: Mar. 1, 2016

(54) SYSTEMS AND METHODS FOR DISPLAYING FOREIGN CHARACTER SETS AND THEIR TRANSLATIONS IN REAL TIME ON RESOURCE-CONSTRAINED MOBILE DEVICES

(71) Applicant: Translate Abroad, Inc., Providence, RI (US)

(72) Inventors: Ryan Rogowski, Naperville, IL (US); Huan-Yu Wu, Taipei (TW); Kevin Anthony Clark, Warwick, RI (US)

(73) Assignee: Translate Abroad, Inc., Providence, RI (US)

( * ) Notice: Subject to any disclaimer, the term of this patent is extended or adjusted under 35 U.S.C. 154(b) by 0 days.

(21) Appl. No.: 14/855,082

(22) Filed: Sep. 15, 2015

(65) Prior Publication Data
US 2016/0004692 A1    Jan. 7, 2016

Related U.S. Application Data

(63) Continuation-in-part of application No. PCT/IB2014/001371, filed on Mar. 12, 2014.

(60) Provisional application No. 61/791,584, filed on Mar. 15, 2013.

(51) Int. Cl.
*G06K 9/00* (2006.01)
*G06F 17/28* (2006.01)
(Continued)

(52) U.S. Cl.
CPC .......... *G06F 17/2863* (2013.01); *G06F 17/275* (2013.01); *G06F 17/289* (2013.01);
(Continued)

(58) Field of Classification Search
CPC ......... G06K 9/00; G06K 9/4638; G06K 9/18; G06K 9/222; G07D 7/20; G07D 7/12; H04M 1/72522; H04M 1/72527
USPC ................................. 382/181, 182, 135, 187
See application file for complete search history.

(56) References Cited

U.S. PATENT DOCUMENTS

| | | |
|---|---|---|
| 5,875,421 A | 2/1999 | Takeuchi |
| D453,766 S | 2/2002 | Grandcolas et al. |

(Continued)

FOREIGN PATENT DOCUMENTS

| | | |
|---|---|---|
| EP | 2587389 A1 | 5/2013 |
| WO | 2013040107 A1 | 3/2013 |

(Continued)

OTHER PUBLICATIONS

Quest Visual Inc, "Word Lens," Quest Visual website, available at http://questvisual.com/us/Accessed on Jan. 11, 2014.

(Continued)

*Primary Examiner* — Ruiping Li
(74) *Attorney, Agent, or Firm* — American Patent Agency PC; Daniar Hussain; Karl P. Dresdner, Jr.

(57) ABSTRACT

The present invention is related to systems and methods for providing one or more translations in a real-time video feed of a first language into a second language, comprising selecting a vertical language text translation box corresponding to a plurality of words in the first language; cropping a frame of the real-time video feed of one or more words of the first language to fit inside a bounding box to produce a cropped frame; performing character segment detection on the cropped frame to produce a plurality character segments; performing character merging on the character segments to produce a plurality of merged character segments; performing character recognition on the merged character segments to produce a plurality of recognized characters; and performing one or more translations on the recognized characters of the first language into one or more translated words of the second language.

30 Claims, 25 Drawing Sheets

(51) Int. Cl.
*G06K 9/38* (2006.01)
*G09G 5/00* (2006.01)
*G06F 17/27* (2006.01)

(52) U.S. Cl.
CPC .............. *G06F17/2854* (2013.01); *G06K 9/00* (2013.01); *G06K 9/00671* (2013.01); *G06K 9/38* (2013.01); *G09G 5/00* (2013.01); *G06K 2209/011* (2013.01)

(56) References Cited

U.S. PATENT DOCUMENTS

| | | | |
|---|---|---|---|
| D479,531 S | 9/2003 | Yanagida | |
| D486,499 S | 2/2004 | Hayashi et al. | |
| D523,440 S | 6/2006 | Hernandez et al. | |
| D541,291 S | 4/2007 | Zhou et al. | |
| D553,140 S | 10/2007 | Noviello et al. | |
| D601,154 S | 9/2009 | Pelczarski et al. | |
| 7,992,085 B2 * | 8/2011 | Wang-Aryattanwanich et al. ................ | G06F 9/4443 715/711 |
| 8,386,231 B2 | 2/2013 | Lebeau et al. | |
| D678,894 S | 3/2013 | Kanalakis et al. | |
| D680,109 S | 4/2013 | Akana et al. | |
| D681,657 S | 5/2013 | Deng | |
| D682,854 S | 5/2013 | Kanalakis et al. | |
| 8,484,218 B2 | 7/2013 | Raghunath et al. | |
| D687,846 S | 8/2013 | Jou | |
| D694,258 S | 11/2013 | Lee et al. | |
| D697,077 S | 1/2014 | Rodenhouse et al. | |
| D697,078 S | 1/2014 | Carlin et al. | |
| D706,803 S | 6/2014 | Rogowski et al. | |
| 2003/0110515 A1 * | 6/2003 | Satoda ............. | H04N 21/23418 725/135 |
| 2007/0050183 A1 | 3/2007 | Kao et al. | |
| 2011/0090253 A1 | 4/2011 | Good | |
| 2012/0179448 A1 | 7/2012 | Gupta et al. | |
| 2012/0323707 A1 | 12/2012 | Urban | |
| 2012/0330642 A1 | 12/2012 | Kalb et al. | |
| 2012/0330643 A1 | 12/2012 | Frei et al. | |
| 2013/0030789 A1 | 1/2013 | Dalce | |
| 2013/0041647 A1 | 2/2013 | Ramerth et al. | |
| 2013/0211814 A1 | 8/2013 | Derks et al. | |
| 2013/0226557 A1 | 8/2013 | Uszkoreit et al. | |
| 2013/0234945 A1 | 9/2013 | Goktekin | |
| 2013/0238336 A1 | 9/2013 | Sung et al. | |
| 2013/0253901 A1 | 9/2013 | Krack et al. | |
| 2013/0253903 A1 | 9/2013 | Stephen et al. | |
| 2013/0293577 A1 | 11/2013 | Perez et al. | |
| 2014/0006006 A1 | 1/2014 | Christ | |
| 2014/0006007 A1 | 1/2014 | Sumita et al. | |

FOREIGN PATENT DOCUMENTS

| | | |
|---|---|---|
| WO | 2013134090 A1 | 9/2013 |
| WO | 2014001937 A1 | 1/2014 |

OTHER PUBLICATIONS

Pleco Software Inc, "Pleco Chinese Dictionary," Pleco software website, available at https://www.pleco.com/Accessed on Jan. 11, 2014.
AT&T, "AT&T Translator," AT&T website, available at http://www.att.com/gen/press-room?pid=22626 Accessed on Jan. 11, 2014.
Babelshot, "Babelshot Photo Translator App," available https://itunes.apple.com/us/app/babelshot-photo-translator/id334194705?mt=8 Accessed on Jan. 11, 2014.
Go Food Apps, "ESCARGO," available at http://www.gofoodapps.com/Accessed on Jan. 11, 2014.
Purdue University App Translator, "Purdue University App Translator," Purdue University App Translator website, available at http://www.purdue.edu/newsroom/research/2011/110908BoutinMenutranslate.html Accessed on Jan. 11, 2014.
Clear Menu, "Clear Menu," Clear Menu website, available at http://www.clear2all.com/site/pages/57 Accessed on Jan. 11, 2014.
Babelphone, "Babelphone," Babelphone website, available at http://appworld.blackberry.com/webstore/content/3892/?countrycode=US&lang=en Accessed on Jan. 11, 2014.
Lonely Planet Phrase Books, "Lonely Planet Phrase Books," Lonely Planet Phrase Books website, available at http://www.lonelyplanet.com/apps-and-ebooks/ Accessed on Jan. 11, 2014.
iLINGUAL, "iLingual," iLingual website, available at https://itunes.apple.com/us/app/ilingual-french/id331907531?mt=8 Accessed on Jan. 11, 2014.
World Nomads Language Guides, "World Nomads Language Guides," World Nomads Language Guides website, available at http://journals.worldnomads.com/language-guides/ Accessed on Jan. 11, 2014.
Speakerlike iPHONE Translator, "SpeakLike iPhone Photo Translator," SpeakLike iPhone Photo Translator website, available at http://www.speaklike.com/products/iphone-photo-translator/ Accessed on Jan. 11, 2014.
Translation Pronouniciation, "Translation pronouniciation," Translation pronouniciation website, available at https://itunes.apple.com/us/app/60+-languages-translation+voice+pronunciation+ocr/id345780733?mt=8 Accessed on Jan. 11, 2014.
Wordtrans, "Wordtrans," Wordtrans website, available at http://wordtrans.com/ Accessed on Jan. 11, 2014.
Camdictionary, "CamDictionary App," available at https://play.google.com/store/apps/details?id=com.intsig.camdict&hl=en Accessed on Jan. 11, 2014.
Photo Translator, "Photo Translator App," available at https://itunes.apple.com/us/app/photo-translator-free/id478334807?mt=8 Accessed on Jan. 11, 2014.
Translation Prounuciation, "Translation Pronunciation App," available at https://itunes.apple.com/us/app/60+-languages-translation+voice+pronunciation+ocr/id345780733?mt=8 Accessed on Jan. 11, 2014.
Google Glass, "Google Glass Translation App," available at http://www.mediabistro.com/appnewser/word-lens-brings-real-time-translation-app-to-google-glass_b42878 Accessed on Jan. 11, 2014.

* cited by examiner

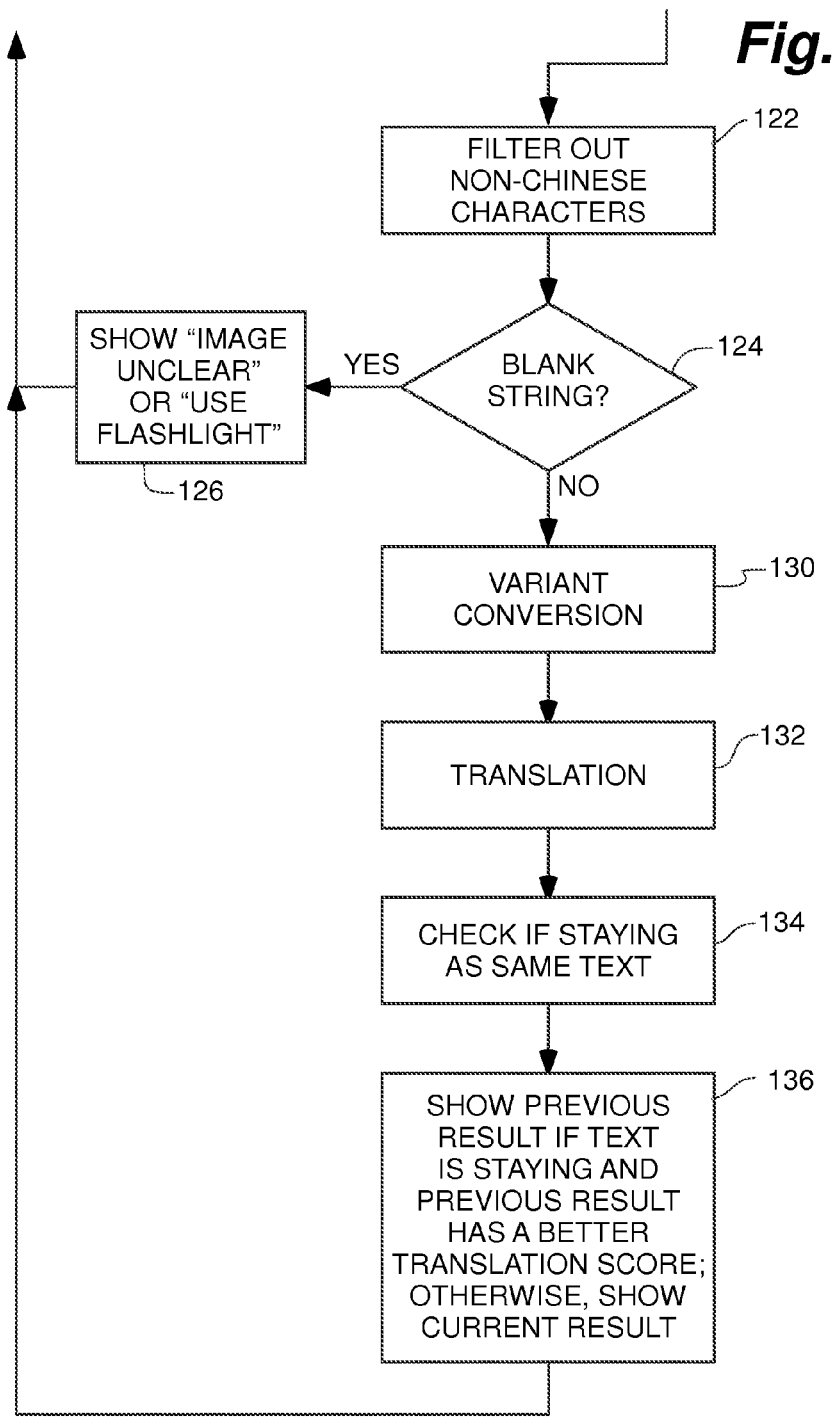

200

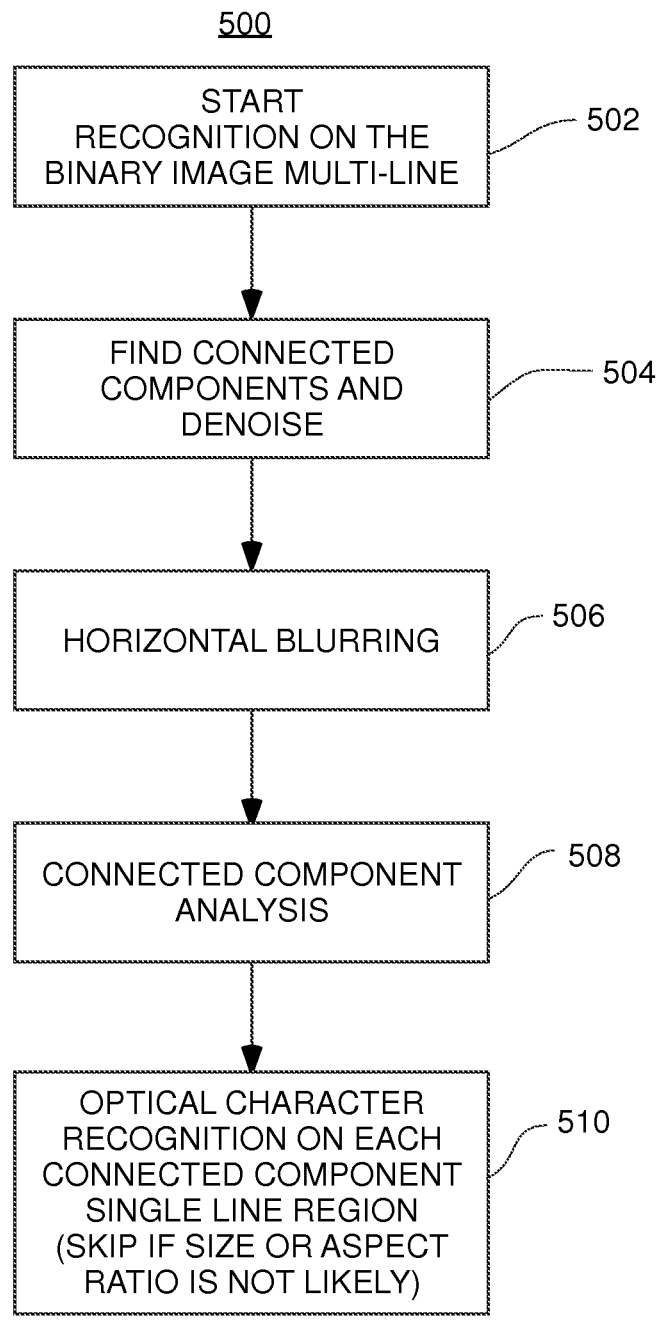

550

1200

SYSTEMS AND METHODS FOR DISPLAYING FOREIGN CHARACTER SETS AND THEIR TRANSLATIONS IN REAL TIME ON RESOURCE-CONSTRAINED MOBILE DEVICES

REFERENCE TO RELATED APPLICATIONS

This application is a Continuation-In-Part ("Bypass CIP") of and claims the benefit of International PCT Application Serial No. PCT/IB2014/001371, filed on Mar. 12, 2014, entitled "Systems and methods for displaying foreign character sets and their translations in real time on resource-constrained mobile devices," which designated the U.S., which itself claims priority from U.S. Ser. No. 61/791,584, filed on Mar. 15, 2013, entitled "Recognition System," the entireties of both of which are hereby incorporated by reference herein.

NOTICE OF COPYRIGHTS AND TRADEDRESS

A portion of the disclosure of this patent related document contains material which is subject to copyright protection. This patent related document may show and/or describe matter which is or may become tradedress of the owner. The copyright and tradedress owner has no objection to the facsimile reproduction by anyone of the patent disclosure as it appears in the Patent and Trademark Office patent files or records, but otherwise reserves all copyright and tradedress rights whatsoever.

FIELD OF THE INVENTION

The present invention is generally related to systems and methods for translating Asian character sets. More specifically, the present invention relates to systems and methods for displaying Asian character sets and their translations in real time after image processing and recognition of Asian character sets on resource-constrained mobile devices. The present invention may be used to help travellers in a foreign country with difficulties in reading and understanding text written in the local language of that country. More generally, the present invention is also applicable to translations between any two languages.

BACKGROUND OF THE INVENTION

The statements in this section merely provide background information related to the present disclosure and may not constitute prior art.

Travelers in a foreign land often need to be able to read and understand some text written in a foreign language, such as a restaurant name or address, a restaurant menu, a street sign, a book, a map, a train schedule, or a newspaper. Conventionally a traveler may use a foreign translation book, hire a guide, or ask local people for help. These approaches are awkward and the increasing use of English by foreigners throughout the world as their second language is not going to end this language barrier.

Translating devices are known that use complex image processing and optical character recognition (OCR) software. OCR has significantly improved since its inception in the early 1990s and it is used on the Internet; however, foreign travelers generally do not have a mobile device with an Internet connection in a foreign country. Thus a translation device for a traveler needs to function adequately offline, that is, without the resources afforded by a connection to the Internet and access to an online server.

Offline OCR applications for mobile camera devices have size limitations in terms of size of the program code. There are limits to the speed of the image processing and OCR algorithms offline as well. There are limitations in types of processors and in memory resources in mobile camera devices. Offline mobile translator devices also suffer from a lack of translation accuracy and reproducibility. Generally mobile translation devices will be used to capture a single image frame of the foreign text to be translated. OCR will be performed on the captured image frame of the foreign text to translate the foreign language text into a language that can be read by the traveler. However, during image capture of the foreign text using a hand-held mobile camera device such as a smart phone, there are image capture problems which include camera movement, poor text image focus, and improper foreign text illumination. OCR requires a clear distinctive text image for an accurate and stable foreign text translation so a non-clear text image will mislead the OCR software, which will then produce a defective language translation. Thus it is known that offline translation apps for mobile camera devices such as smartphones frequently do not perform accurate and stable translations. The translations may fluctuate, jitter, or even make no sense at all.

For these reasons, there exists an important need for solutions to these problems related to current translation technology for mobile camera devices to bring improved speed, accuracy, and meaning in translations. There is a need for translations in real-time and with grammar linguistics to allow for a better touristic experience in a foreign land. What are needed are a method, system, and apparatus for rapid and meaningful translation of a foreign language text in real-time, on a resource-constrained mobile device, without the requirement for Internet connectivity.

Therefore, it would be an advancement in the state of the art to provide a method for rapid and accurate translation of a foreign language in real-time with accuracy to resolve the shortcomings of existing solutions. It would also be an advance in the state of the art to provide this translation method in a mobile device that can translate the foreign language in real-time without the need for Internet connectivity to automatically provide the tourist with meaningful information. It would be a further an advancement that such a translation is cost-efficient, does not require translators or dictionaries, or manual entering of text into the mobile device. It would be a further advancement in the state of the art to provide multi-line translation methods and systems that can translate multiple lines of foreign languages, such as, but not limited to, multiple lines of a foreign language menu. Finally, it would be a further advancement in the state of the art to provide user interfaces, systems, and methods for translating character sets that are displayed vertically. It is against this background that various embodiments of the present invention were developed.

BRIEF SUMMARY OF THE INVENTION

Embodiments of the present invention include a method and a system for a translation of one or more words of a first language into one or more words of a second language using a mobile camera device.

Accordingly, and in accordance with an illustrative embodiment, the present invention in one aspect is a method for providing one or more translations in a real-time video feed of a first language into a second language, comprising selecting a vertical language text translation box corresponding to a plurality of words in the first language, wherein the first language is an Asian language comprising a plurality of characters having a vertical alignment, and wherein the second language is a Roman language; cropping a frame of the real-time video feed of one or more words of the first language to fit inside a bounding box to produce a cropped frame; performing character segment detection on the cropped frame to produce a plurality character segments; performing character merging on the character segments to produce a plurality of merged character segments; performing character recognition on the merged character segments to produce a plurality of recognized characters; performing one or more translations on the recognized characters of the first language into one or more translated words of the second language; and displaying the translated words of the second language in augmented reality in the real-time video feed.

Another embodiment includes the method described above, further comprising additional pre-processing steps before the step of performing the character segment detection, the pre-processing steps comprising deciding a threshold type and performing binarization on the cropped frame to produce a binary frame; performing connected component analysis on the binary frame to produce analyzed connected components; and de-noising analyzed connected components in the binary frame before performing the character segment detection on the binary frame.

Another embodiment includes the method described above, further comprising deciding whether a text precursor is detected after performing the pre-processing steps on the cropped frame before proceeding with the step of character segment detection.

Another embodiment includes the method described above, wherein the step of performing the character segment detection comprises additional steps of storing text precursors in a memory device; performing merging of any two text precursors when the two text precursors are overlapping and/or neighboring; examining the text precursors' character size; and ending character segment detection for small text precursor characters.

Another embodiment includes the method described above, wherein the step of performing the character merging further comprises performing vertical and/or horizontal merging on the character segments with recognition feedback to produce the plurality of merged character segments, while also calculating a recognition distance score in addition to the shape score for the at least one merged character segment.

Another embodiment includes the method described above, wherein the step of performing the character recognition on the merged character segments comprises additional steps of setting a region of interest on the merged character segments; normalizing the region of interest of the merged character segments to produce a normalized ROI; performing feature extraction on the normalized ROI to produce extracted features; performing dimensionality reduction on the extracted features to produce dimensionally reduced features; and performing classification on the dimensionally reduced features.

Another embodiment includes the method described above, wherein the step of performing the character recognition further comprises calculating a recognition distance score for the at least one merged character segment; and combining the recognition distance score and a shape score into a combined score for the at least one merged character segment to produce a recognized character with a high combined score.

Another embodiment includes the method described above, wherein the step of performing the one or more translations further comprises processing the recognized characters through a translation engine to produce the translation of the recognized characters in the first language into the one or more translated words of the second language, while calculating a translation engine score representing how many and/or how well characters have been translated for each translated line.

Another embodiment includes the method described above, wherein the first language is selected from the group consisting of Chinese, Korean, Japanese, Vietnamese, Khmer, Lao, and Thai.

Another embodiment includes the method described above, wherein the first language is Chinese or Japanese, and the second language is English.

Another embodiment includes the method described above, further comprising utilizing a conversion table for converting dialects of the first language into a smaller number of dialects of the first language before translating the first language into the second language.

Another embodiment includes the method described above, wherein the second language is selected from the group consisting of English, French, Spanish, German, Italian, Portuguese, Russian, Hindi, Greek, Hebrew, and Arabic.

Another embodiment includes the method described above, further comprising moving the one or more translated words of the second language when a mobile device is moved without recalculating the one or more translations.

Another embodiment includes the method described above, further comprising pausing the one or more translations which are displayed to allow a movement of a mobile device without changing displayed language translation.

Another embodiment includes the method described above, further comprising displaying a phonetic pronunciation of the one or more words of the first language being translated.

Another embodiment includes the method described above, wherein a translated line having a highest translation quality is selected for display, and wherein the translation quality is determined by how many and/or how well the one or more words of the first language are translated.

Another embodiment includes the method described above, wherein the step of performing character merging on the character segments to produce the plurality of merged character segments further comprises determining at least a shape score for at least one merged character segment.

Another embodiment includes the method described above, wherein the step of performing character recognition on the merged character segments further comprises utilizing at least the shape score of the at least one merged character segment to produce the plurality of recognized characters with high scores.

In accordance with another illustrative embodiment, the present invention in one aspect is a method for translating a video feed in real-time augmented reality from a first language to a second language using a mobile device, the mobile device comprising a video camera, a processor, a memory, and a display. The method in one aspect comprises the steps of (a) capturing a frame in real-time from the video feed of one or more words in the first language which need to be translated using the video camera to produce a captured frame; (b) cropping the captured frame to fit inside an image processing bounding box to produce a cropped frame; (c) pre-processing the cropped frame to produce a pre-processed frame; (d) performing character segment recognition on the pre-processed frame to produce a plurality of character segments; (e) performing character merging on the character segments to produce a plurality of merged character segments; (f) performing character recognition on the merged character segments to produce a recognized frame having a plurality of recognized characters; (g) processing the recognized frame through a translation engine to produce a translation of the recognized characters in the first language into one or more words of the second language to produce a translated frame, while also calculating a translation quality representing how well the recognized characters have been translated for each translated frame; (h) storing the translated frame to the memory as a current translated frame, wherein a previous translated frame is also stored in the memory; (i) checking that the bounding box has stayed on a same set of characters for the current translated frame and the previous translated frame by determining a fraction of similar characters that are overlapping between the current translated frame and the previous translated frame, wherein a higher fraction indicates that the bounding box has stayed on the same set of characters for the current translated frame and the previous translated frame; (j) comparing the translation quality determined by the translation engine for the current translated frame to a previous translation quality for the previous translated frame; (k) selecting one of the previous translated frame and the current translated frame to be removed from the memory based on a frame having a lower translation quality; and (l) displaying an optimal translated frame from the previous translated frame and the current translated frame, the optimal translated frame having a higher translation quality, wherein the words of the second language are overlaid over or next to the words in the first language which is being translated in an augmented reality on the display of the mobile device. In some embodiments, the translation quality is determined by how many and/or how well the one or more words of the first language are translated based on a translation engine score, also known simply as a translation score. This illustrative method may be embodied on a mobile device (such as a smartphone, a tablet, a wearable computer, a wearable eye glass, and/or a laptop computer), on a computer-readable storage medium, or transmitted via a network.

According to another embodiment, the present invention is a method for a translation from a first language to a second language using a mobile camera device, the method comprising the steps of: (a) positioning the mobile camera device to display a video image of one or more words in the first language which need to be translated so that the mobile camera device can capture frames of a video feed of the one or more words in the first language for translation; (b) cropping the frames of the video feed to fit inside an image processing bounding box for image processing; (c) storing cropped frames of the video feed to a memory device; (d) pre-processing cropped frames of the video feed in the image processing bounding box; (e) performing character segment recognition on pre-processed frames of the video feed in the image processing bounding box; (f) performing horizontal merging with recognition feedback on character segment recognized frames of the video feed in the image processing bounding box; (g) performing binary or greyscale character recognition on horizontally merged character segment recognized frames of the video feed in the image processing bounding box; (h) processing character recognized frames of the video feed in the image processing bounding box for producing a translation of the one or more words in the first language into one or more words of the second language; (i) storing the one or more translated words of the second language to a location in the memory device as a current frame of a language translation video image; (j) checking that the image processing bounding box has stayed on the same first language text characters for the current frame and a previous frame of the language translation video image; (k) comparing translation quality in the current frame of the language translation video image to the translation quality in the previous frame of the language translation video image, wherein both the current frame of the language translation video image and the previous frame of the language translation video image are being saved in the memory device; (l) selecting one or more lower quality frames of the language translation video image to be deleted from storage in the memory device; and (m) using the mobile camera device for displaying one or more higher quality frames of the language translation video image of the one or more words of the second language while also displaying the video image of the one or more words in the first language which is being translated.

Another embodiment of the present invention also includes a method for displaying the one or more higher quality frames of the language translation video image of the one or more words of the second language in real time augmented reality.

Another embodiment of the present invention also includes a method for translating a first language selected from the group consisting of Chinese, Korean, Japanese, Vietnamese, Khmer, Lao, Thai, English, French, Spanish, German, Italian, Portuguese, Russian, Hindi, Greek, Hebrew, and Arabic. In some embodiments, the process can auto-detect which language is being presented in the video feed without the user having to select one.

Another embodiment of the present invention also includes a method for using a conversion table for converting dialects of the first language into a smaller number of dialects of the first language before translating the first language into the second language.

Another embodiment of the present invention also includes a method for using a conversion table to convert all traditional Chinese text characters to simplified Chinese text characters before translating the first language into the second language.

Another embodiment of the present invention also includes a method for obtaining a translation into a second language selected from the group consisting of Chinese, Korean, Japanese, Vietnamese, Khmer, Lao, Thai, English, French, Spanish, German, Italian, Portuguese, Russian, Hindi, Greek, Hebrew, and Arabic.

Another embodiment of the present invention also includes a method for selecting a single line of the first language or multiple lines of the first language for translation into the second language by changing a bounding box size on the mobile camera device which displays the video image of the first language.

Another embodiment of the present invention also includes a method for automatically moving the second language translation on the screen when the mobile camera device is moved without recalculating the translation.

Another embodiment of the present invention also includes pausing the language translation which is displayed on the mobile camera device to allow a movement of the mobile camera device without changing a displayed language translation.

Another embodiment of the present invention also includes storing a paused language translation comprising the first language and the translation of the first language into the second language in a memory device for a later review.

Another embodiment of the present invention also includes a method for comparing translation quality in the current frame of the language translation video image to the translation quality in the previous frame of the language translation video image, wherein the translation quality of the language translation video image can be determined by how well the string of the first language is translated.

Another embodiment of the present invention also includes a method for checking that the image processing bounding box has stayed on the same first language text characters for the current frame and a previous frame of the language translation video image, the method comprising the steps of: (a) counting a number of similar language text characters in a current language text translation image string and in a previous language translation image string; and (b) calculating what fraction of these similar language text characters are overlapping in the current and the previous language translation image strings, wherein the higher the fraction, the greater the extent that the processing bounding box has stayed on the same language text for the current and the previous language translation text images.

Another embodiment of the present invention also includes a method for displaying a pronunciation of the one or more words of the first language being translated.

Another embodiment of the present invention is a computer system for translating a foreign language on a mobile camera device, the system comprising: a mobile camera for capturing a video image of the one or more words in the first language for translation of the first language text; a program code; a processor for processing the program code; one or more memories connected to the processor for storing the program code, which when executed by the processor causes the processor to execute a process, the process comprising the steps of: (a) positioning the mobile camera device to display a video image of one or more words in the first language which need to be translated so that the mobile camera device can capture frames of a video feed of the one or more words in the first language for translation; (b) cropping the frames of the video feed to fit inside an image processing bounding box for image processing; (c) storing cropped frames of the video feed to a memory device; (d) pre-processing cropped frames of the video feed in the image processing bounding box; (e) performing character segment recognition on pre-processed frames of the video feed in the image processing bounding box; (f) performing horizontal merging with recognition feedback on character segment recognized frames of the video feed in the image processing bounding box; (g) performing binary or greyscale character recognition on horizontally merged character segment recognized frames of the video feed in the image processing bounding box; (h) processing character recognized frames of the video feed in the image processing bounding box for producing a translation of the one or more words in the first language into one or more words of the second language; (i) storing the one or more translated words of the second language to a location in the memory device as a current frame of a language translation video image; (j) checking that the image processing bounding box has stayed on the same first language text characters for the current frame and a previous frame of the language translation video image; (k) comparing translation quality in the current frame of the language translation video image to the translation quality in the previous frame of the language translation video image, wherein both the current frame of the language translation video image and the previous frame of the language translation video image are being saved in the memory device; (l) selecting one or more lower quality frames of the language translation video image to be deleted from storage in the memory device; and (m) using the mobile camera device for displaying one or more higher quality frames of the language translation video image of the one or more words of the second language while also displaying the video image of the one or more words in the first language which is being translated.

The present invention also includes related system embodiments, which include various methods of the present invention that are carried out by the system. Such a system could be implemented as a computer system embedded in a mobile camera device. Other embodiments include non-transitory physical storage medium storing program code, which when executed by a hardware processor, causes the hardware processor, or a computer system that carries the hardware processor, to implement the various methods of the present invention. Other features and advantages of the various embodiments of the present invention will become apparent from the following more particular description descriptions of embodiments of the invention as illustrated in the accompanying drawings.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIG. 1B illustrates process steps 122 to 136 of the flowchart of the process of FIG. 1A for translating a single line of a language in accordance with one embodiment of the present invention.

FIG. 5A illustrates a flowchart of a process for multi-line recognition of a binary image having a light background and a dark text and for multi-line recognition of a binary image having a dark background and a light text in accordance with one embodiment of the present invention.

DETAILED DESCRIPTION OF THE INVENTION

Illustrative Definitions

The following terms as used in this specification are illustrative only, and are not meant to be read as limiting the scope of the present invention or its uses:

"first language" means the language that is translated by a mobile camera device using an embodiment of the present invention. The word or words of the first language to be translated need to appear in focus in the target box of the mobile camera device before any translation can occur.

"second language" means the language in which the translation is displayed by a mobile camera device using an embodiment of the present invention. The translation in the second language is displayed as an augmented reality image on the mobile camera device.

"translation" means a language translation, more particularly to a language text translation involving the translation of a first language text into a second language text. In this context, the term "translation" means a process for rendering a word text of a first language into a word text of a second language having the same meaning. As previously indicated, words, or phrases of the first language can appear to a user of the present invention in various venues and forms, including printed words of a restaurant menu, book, a train schedule, a street sign, a store sign, and the like. The text communication of the second language can be read by the user on the display of the mobile camera device as illustrated in FIGS. 11-14.

"real-time" means in real-time or near real-time, where the user can view the translation without a significant time delay. Real-time does not necessarily mean instantaneously in the mathematical or physical sense, but only appears instantaneously to the user. The present invention can perform a language text translation in real-time.

"video feed" means the frames of video images.

"mobile camera device" means a portable hardware device which has a camera which functions with a processor, a memory device, and a program code (application) as a system and for accomplishing methods for using the present invention.

Figure 11:
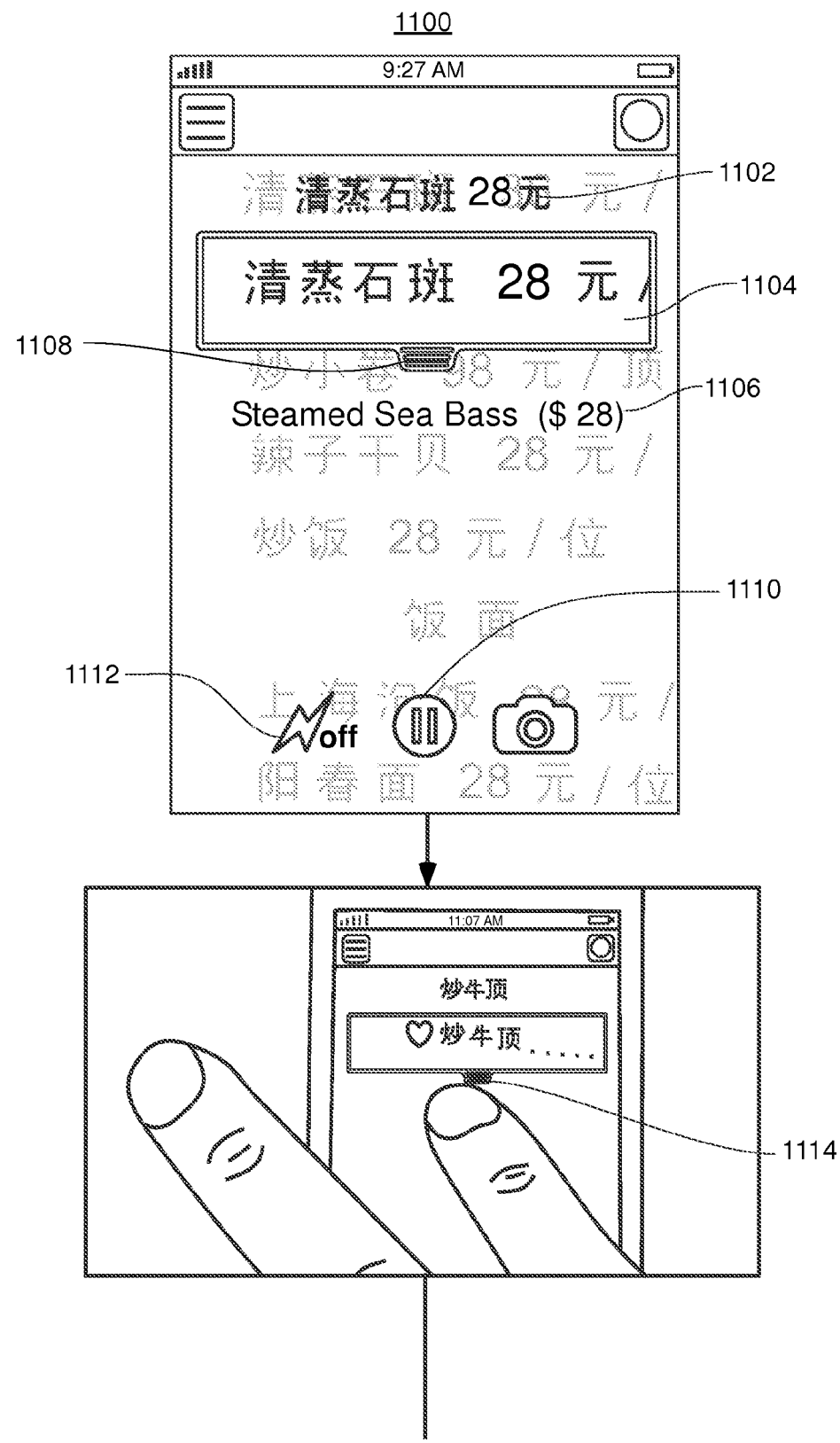
FIG. 11 depicts an example of a user interface of a mobile camera device displaying algorithm-generated characters of the first language Chinese characters in the bounding box, and displaying below the bounding box the translation of the first language Chinese characters into the second language, in accordance with one embodiment of the present invention.
Figure 13:
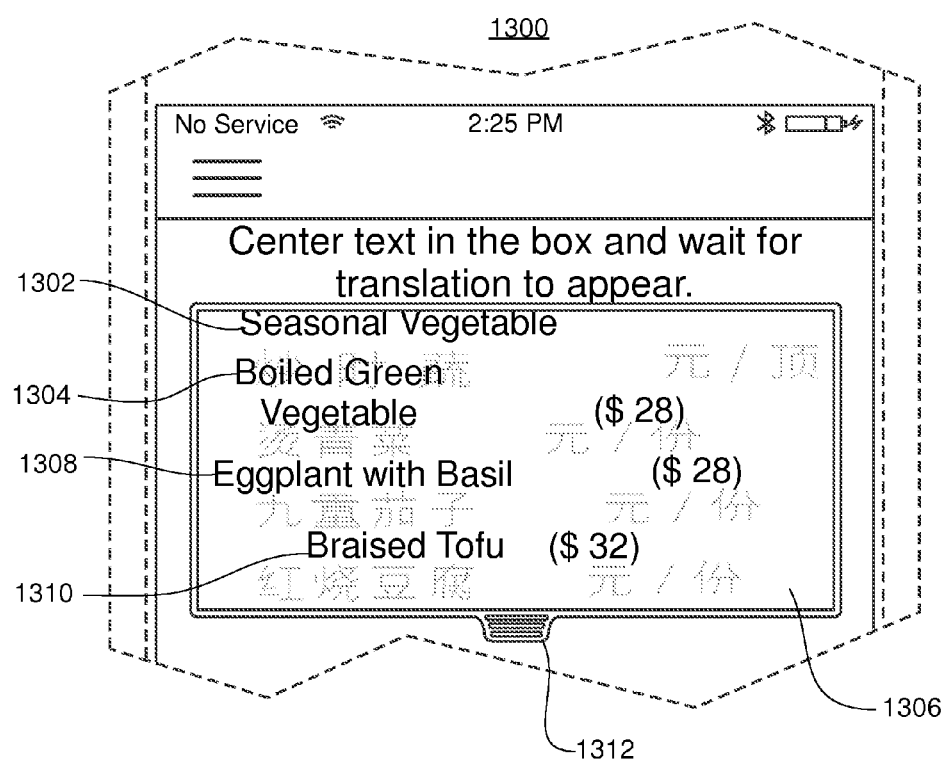
FIG. 13 depicts a portion of FIG. 12 in which the first language Chinese characters are more readily seen as would be the case when a user is practicing one embodiment of the present invention.

"target box" means a viewfinder box on the user interface of the mobile camera device. The target box height can be set to permit viewing and translating only a single line of a first language text as shown in FIG. 11 with target box 1104. The target box height can be increased to permit viewing and translating multiple lines of the first language text as depicted in FIG. 13 with target box 1306. The present invention processes first language words appearing in the target box for translation.

"character" means conventional text features of the first language text which would be recognized visually as a letter, letters, a word, words, a character, characters, a character set, character sets, or any other term relating to a language text.

"cropping" means a process to reduce an image to a size of a target box.

"character segment recognition" means a process that extracts probable character components to be processed in the image for recognition.

"character merging" means a process that combines two or more components that are likely to be character components to be recognized.

"character recognition" means a process that recognizes a character in a region of the pre-processed image.

"recognized frame" means a frame in which one or more characters have been recognized.

"augmented reality" means a computer-mediated reality through the use of a wearable computer or hand-held device such as a smartphone, wherein the computer is used to add or subtract information from, or otherwise manipulate one's perception of reality. Typically, it is the user's visual perception of the environment that is mediated. This is done through the use of some kind of electronic device, such a smartphone, which can act as a visual filter between the real world and what the user perceives. Examples of wearable computers include GOOGLE GLASS™, and the like.

"single line" means a single line of foreign language text.

"multi-line" means two or more lines of foreign language text.

"pre-processing" means a process that makes text information on an image clearer and removes unnecessary information before the main recognition process begins.

"up-sampling" means a process that resizes an image to a bigger size.

"threshold type" indicates how to convert image pixel values above and below a given threshold. The process decides if a cropped image is of dark text with light background, or light text with dark background so an appropriate threshold type can be applied to the binarization process.

"binarization" means a process that converts image pixel values to one of two values, 1 or 0.

"connected component analysis (CCA)" means an analysis used in image processing applications to label connected components in a binary image. The connected components are adjacent pixels in the image which are either all black or all white, and each connected component has the same label.

"de-noising" means removing noise which worsen or are not relevant to character recognition in the image.

"text precursor" means character segments which represent possibility of presence of characters before character recognition is performed.

"text precursor character size" means a character size estimated for a text precursor.

"average character size" can be estimated as the size that the majority of the text characters have before translation to the second language. This size can be estimated in terms of a character's dimensions (height and width), and area (height times width).

"horizontally overlapping" means two separate text precursors have portions that have a different vertical coordinates but have common horizontal coordinates with respect to a center horizontal line of the video image frame.

"vertically merging" means combining text precursors which are horizontally overlapping and vertically neighboring.

"binary character recognition" means a character recognition process using a binary image to recognize a character.

"region of interest" (ROI) means a region defined in the image that the algorithm is going to process.

"normalization" means to regulate a shape of an image to a fixed size to reduce the variation of images of same class. The normalization process may help to create the same constant dimensions, so that two images under different conditions will have the same characteristic features.

"feature extraction" means transforming the input data into a set of features. This is useful when the input data to an algorithm is large. Then the input data will be transformed into a reduced representative set of features. The features can extract the relevant information from the input data and perform satisfactorily in the algorithm of the present invention.

"dimensionality reduction" means a pattern recognition process to reduce the number of features to a more manageable number before classification.

"classification with clustering" means performing several types of agglomerative hierarchical clustering. This process works by finding pairs of clusters to merge by following paths in the classification graph of the clusters until the paths terminate in pairs of mutual similar classes.

"vertical and horizontal merging with recognition feedback" means that a few combinations of vertical and/or horizontal merging are selected to perform recognition. Then the recognition results help determine which combination of vertical and/or horizontal merging is likely to be a character. The recognition results are used as feedback to do the merging.

"recognition distance score" measures a closeness of current character segments and a best match of a trained prototype.

"shape score" measures how likely a shape of one or more character segments is an actual character (as opposed to noise etc.).

"combined score" combines the recognition distance score and the shape score to represent an overall likelihood of the one or more character segments to be an actual character (as opposed to noise etc.).

"translation engine" means a software component that carries out a process to generate one or more words of the second language given one or more words of the first language.

"translation engine score," "translation score," "translation quality," all mean the same thing and measure how many and/or how well characters have been translated for a translated frame. How well the one or more words are translated is determined by the translation engine and can be based on how the combination of characters of the first language form the meaning or how the one or more words of the first language fit the context.

"conversion table" converts a character, a word, or a word phrase into another character, word, or word phrase that exists in a dictionary without changing an original meaning.

"traditional Chinese characters" means a form of Chinese characters which may contain more strokes and which most foreigners cannot distinguish form simplified Chinese characters.

"simplified Chinese characters" means a form of Chinese characters used by the present invention in the process steps of translation. The present invention converts all the Chinese characters recognized from the first language text that may be traditional Chinese characters into their corresponding simplified Chinese characters to reduce by at least one half the number of Chinese characters that will have to be sorted during the steps of translation.

"variant conversion" means converting all Chinese characters to simplified Chinese characters before doing the translation. For the present invention, a conversion table was created to halve the size of the dictionary that would have to be searched during the translation of the first language to the second language, with the result that the rate of translation would be doubled. Also, the conversion of traditional Chinese characters to simplified Chinese characters, and then the conversion of the simplified Chinese characters to a second language text can be more accurate than converting both forms of Chinese directly to a second language text "paused language translation frame" means a translated frame that has been paused allowing movement of a camera without movement of a screen.

"phonetic pronunciation" means a combination of symbols that represent sounds of one or more characters of a language.

"stored frames" means saved digital information in a memory device of multiple captured images (i.e., frames) from a video camera.

"greyscale" means a digital image in which the value of each pixel is a single sample, that is, it carries only luminosity intensity information. Also images of this sort are sometimes known as black-and-white, but are known to be composed of shades of grey, varying from black at the weakest intensity to white at the strongest intensity.

"colorscale" means an image having a color depth that may be used on a computing device. It is known that personal computers typically have 24-bit color depth, but the color depth will vary with device capabilities.

"current frame" means a processed video image frame that is the second of two processed video image frames and is the video frame most recently translated.

"previous frame" means a processed video image frame that is the first of two processed video image frames and is the video frame stored in a memory device as the current frame is being processed.

"lower quality frame" means a frame having a lower translation quality or a lower translation engine score.

"higher quality frame" means a frame having a higher translation quality or a higher translation engine score.

"image string" means one passage of a video frame image of the first language text through a process of the present invention.

"blank string" an empty image string with no text.

"translation text" means a content of the second language which is present as a word, words, a language character, language characters, character set, or character sets. The content of the second language is displayed on the mobile camera device as an augmented reality image text.

"aspect ratio" means the ratio between the height and the horizontal width. The aspect ratio of Chinese characters is usually close to 1, as the characters approximate a square.

"vertical language text," "vertical text," "vertical characters," "vertically aligned," and the like refer to any text of any language in which one or more characters are displayed in a vertical alignment, examples include, but not limited to, Chinese, Japanese, or other languages in which the individual characters may be aligned vertically.

System Architecture and Overview

The present invention in one embodiment is a method and a system for using a mobile camera device to provide a translation of a first language into a second language in real-time. The invention in one embodiment is an application operating on a smartphone, using camera elements and software of the smartphone to focus on printed object text in one language, which text may then be seen in a display of the smartphone, and translating the object text in the one language to text in another language. The translated text is displayed to the user in the same display, and proximate the display of the object text. In one implementation the translated text is seen to float over the displayed object text. In alternative embodiments the invention may operate on digital devices other than smartphones. For example, some embodiments may be compatible with iPads, laptop computers, and other computerized appliances. In one embodiment the digital device may be computerized eyeglasses, wherein a wearer of the glasses, observing text in one language, may see text in another language superimposed proximate the original text. In some embodiments functionality may be entirely local to the digital device, and the device may operate off-line practicing embodiments of the invention. In other embodiments a digital device enabled to practice the invention may open a data connection to an on-line server, and some functionality may be provided by software and data at the on-line server.

When one or more lines of the first language have been selected for translation, then the processing system of the present invention places the selected first language text in focus. This enables the user to more readily position the mobile camera target box view of the first language text to be translated. In some embodiments, the focusing of the first language text in the target box is an automatic process. There optionally may be additional focusing methods including tapping a location of the mobile camera device. In some embodiments a light source is used to illuminate the first language text to aid in it's focusing, processing, and translating. In some embodiments there is a zoom control for shrinking on the display which can shrink the selected text to fit in the target box. The zoom may also be used to expand text in the target box to a minimum average size necessary for text processing leading to a translation. Once the first language text is located within the target box, then the text will be made available for processing and translating into a second language text. The words of the first language viewed in the bounding box of the mobile camera device are the words that are translated into the second language.

In some embodiments the target box is sized to contain a single line of a first language text. In this case the translation into the second language text is displayed outside the target box. In another embodiment the user interface displays a pronunciation of the first language text. If the image of the first language in the bounding box is too dark, then a light on the mobile camera device, or another illumination source can be used to perform a better translation.

Methods and systems of the present invention have high level algorithm processing which creates accurate, less jittery translations. Contemplated examples of first and second languages that may be involved in practicing the present invention include languages selected from the group consisting of Chinese, Korean, Japanese, Vietnamese, Khmer, Lao, Thai, English, French, Spanish, German, Italian, Portuguese, Russian, Hindi, Greek, Hebrew, and Arabic. Preferred languages involved in practicing the present invention include translating the Asian languages, particularly Chinese, Korean, and Japanese. A particularly preferred practice of the present invention involves methods and systems for translating Chinese into English. Other human languages not listed here are also contemplated to be within the scope of the present invention, as would be recognized by one of ordinary skill in the art.

For some embodiments of the present invention, contextual information for translation processing is used to a degree which does not affect translation processing speed. For example, in the case of food translations, the food terms can be clustered by extracting ingredients so any prefix or suffix nearby can be clustered together in order to prevent wrong concatenation in translation. The algorithms of the present invention in some embodiments avoid translating single characters that are not food terms when the string is determined as a food item. Such programming controls for the possibility that single characters could possibly be wrong due to the nature of OCR results. Words of multiple characters have much lower chance of being wrong. A word in a first language can have multiple translations in a second language because of context in which the word is used, particularly when the word has multiple meanings in the first language or for fluidity of translation in to the second language. In one preferred embodiment, the invention processes give priority to food translation and then to signs and travel translations.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematic, use case, and/or flow diagrams in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification is not necessarily all referring to the same embodiment, nor is a separate or alternative embodiment mutually exclusive of other embodiments. Moreover, various features are described which may be exhibited by some embodiments and not by others. Similarly, various requirements are described which may be requirements for some embodiments but not other embodiments.

Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Single-Line Translation Embodiments

Figure 1A:
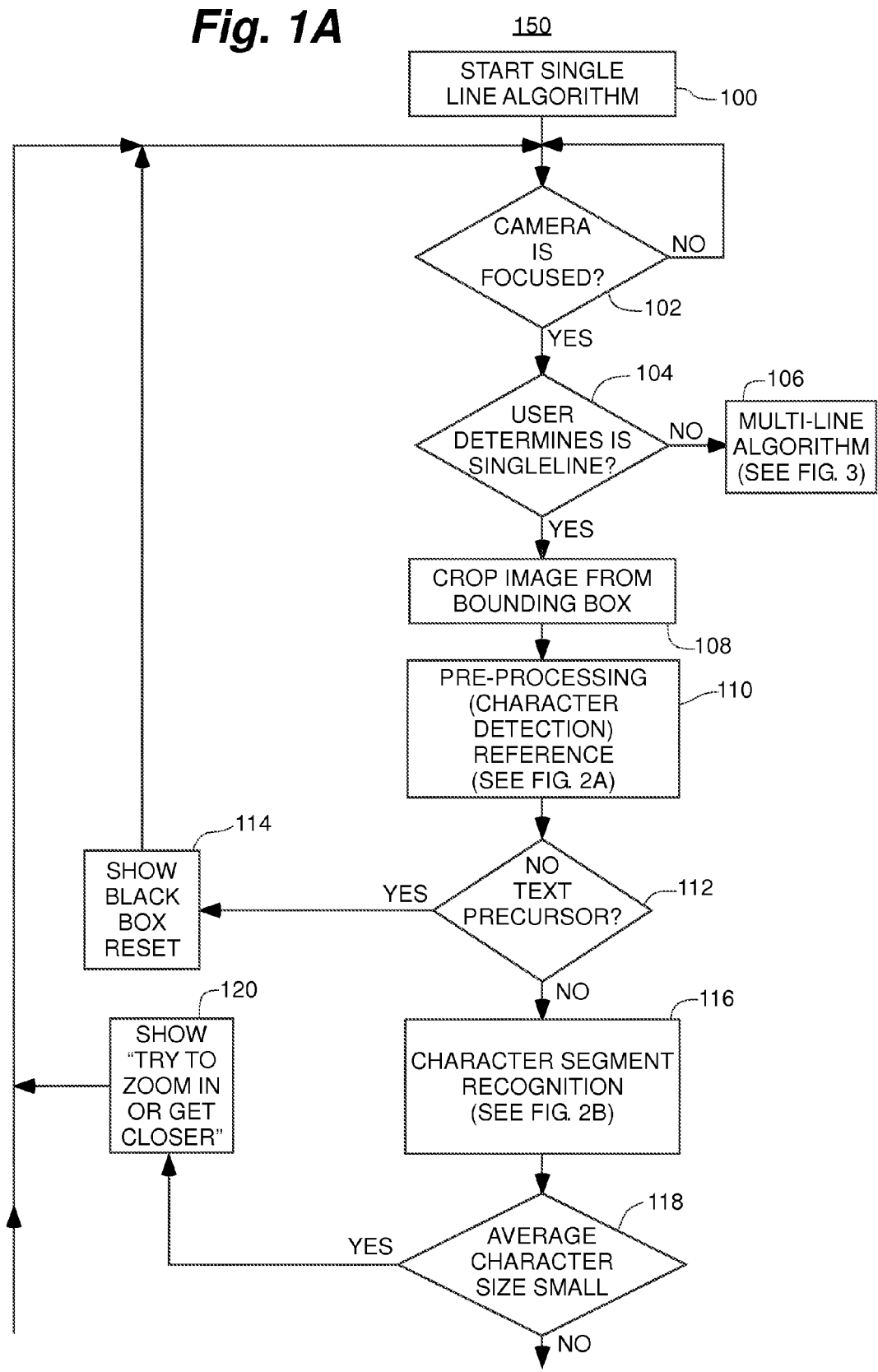
FIG. 1A illustrates process steps 100 to 120 of a flowchart of a process for translating a single line of a language in accordance with one embodiment of the present invention.
Figure 3A:
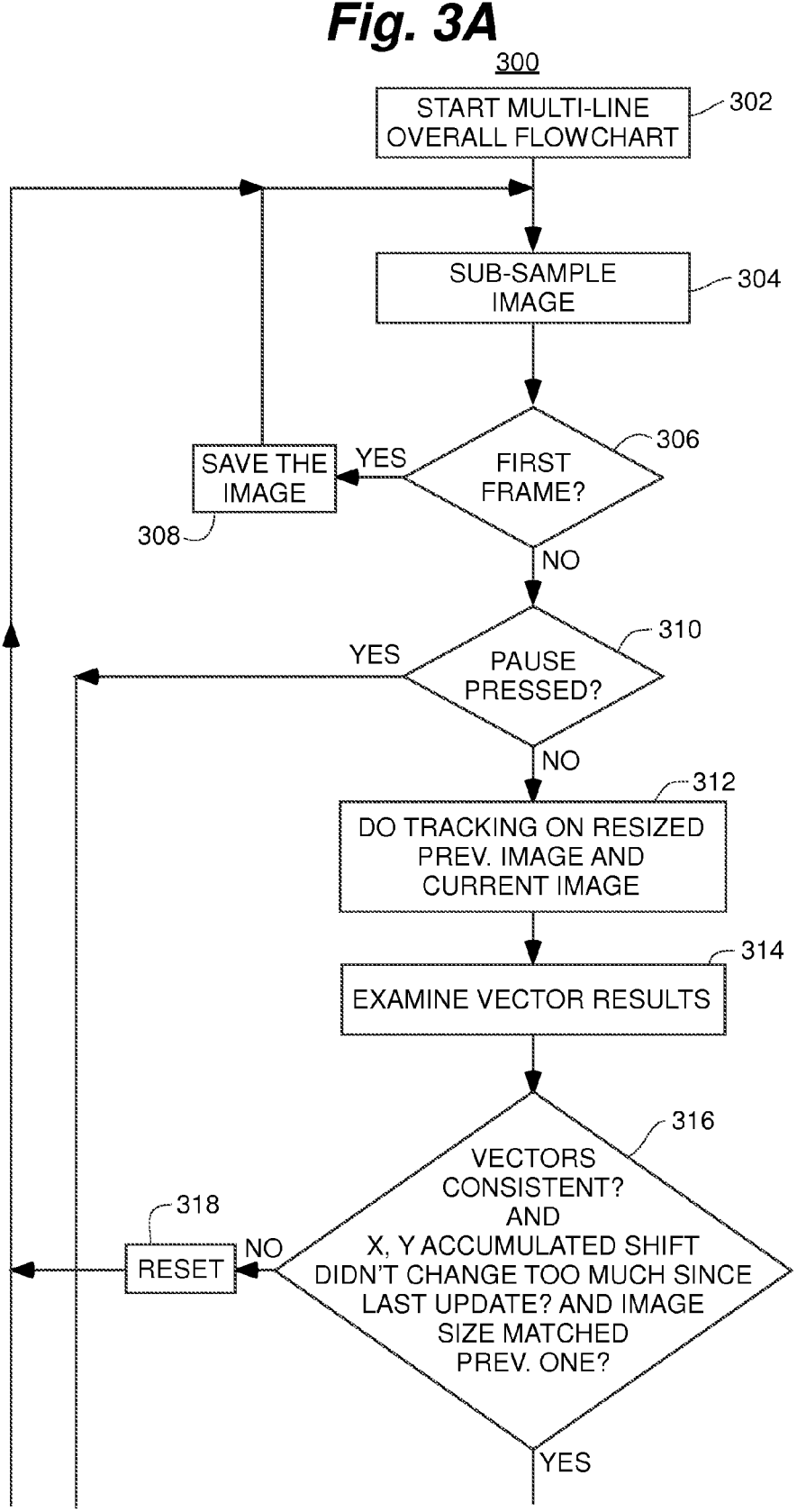
FIG. 3A illustrates process steps 302 to 318 of a flowchart of a process for translating multiple lines of a language in accordance with one embodiment of the present invention.

The drawings merely provide examples of processes for embodiments of the present invention. The example algorithms are directed towards translations processes useful where the first language is Chinese and the translation is into English, but the inventors contemplate the translation between and back and forth between any two languages. FIGS. 1A and 1B illustrate a flowchart 150 of an algorithm or process running in video mode to translate a single line of a first language into a second language in accordance with one embodiment of the present invention. In FIG. 1A, the process 150 begins at step 100. Process 150 runs in video mode. Each time it finishes the process, the process returns to the top and captures a new frame from the video to execute the process again. This process creates a recognized process string and a corresponding translation appears on the mobile camera device display screen. In step 102, a decision is performed by the process to determine if the image on the display of the mobile camera device of the present invention is focused. The process allows the camera on the user device to handle the auto-focus functionality. While the camera is focusing, the process checks step 102 repeatedly without doing any processing until the camera stops focusing. Then, the process goes to step 104 to do the processing. Sometimes the camera may have thought it is already focused, so it will process blurred image without trying to focus. Accordingly, the process provides a tap-to-focus functionality for users to force it to re-focus. In step 104, the process determines if the user has selected a single line of text or multiple lines of text to translate. If the user has selected multiple lines, then the process proceeds to step 106, wherein the multi-line translation process described in FIG. 3 is called; otherwise, the process proceeds with the single line translation.

In step 108, the process crops the image from the image processing bounding box selected by the user. To crop the image refers to removal of the outer parts of the image of the first language characters in a bounding box to accentuate the characters. In step 110, pre-processing occurs for character detection as described below in relation to FIG. 2A. In step 112, a determination is made whether or not pre-processing has revealed a text precursor which would indicate there is some preliminary text information suggestive of a text character. If there is no indication for a text precursor in step 110, the process shows a black box and reset in step 114, or the like, and returns to starting step 100.

If a text precursor has been identified in step 112, then the process of step 116 performs character segment recognition as is described in greater detail in FIG. 2B below. In step 118, the process determines if the characters recognized in the previous step are too small. In the case of the process determining that the recognized characters are too small, the process proceeds to step 120, where a message is displayed to the user, "Try to zoom in or get closer," or the like, and the process returns back to starting step 100. If the recognized characters are determined to be large enough in step 118, then the process proceeds to step 122 in FIG. 1B. In step 122, the process filters out non-Chinese characters and proceeds to step 124 where a determination is made as to whether the process string is blank, meaning no language character for translation has been found in the process string and the process proceeds to step 126, where a message is displayed to the user "Image unclear," "Use flashlight," or the like. The process then proceeds from step 126, back to the beginning of process 150 at starting step 100.

If the determination at step 124 indicates a character has been found, then the process proceeds to step 130, where the process performs a variant conversion. The variant conversion at step 130 reduces the number of terms in the dictionary by converting any Traditional Chinese characters to Simplified Chinese characters. Converting all Chinese characters to Simplified Chinese characters is performed because sometimes the Chinese text to be translated will be a combination of Simplified and Traditional Chinese characters. Converting Traditional to Simplified is much less complicated than converting Simplified to Traditional. Most foreigners cannot distinguish between Simplified and Traditional Chinese characters. The process of step 130 reduces the size of the Chinese character dictionary needed to be scanned in translation processing of the characters of step 132. The smaller Chinese-to-English dictionary substantially decreases the amount of processing, and thus increases the processing speed of the single line algorithm in the mobile camera device because the processing and memory capacity can be a processing speed limitation for some mobile camera devices. In step 132, the process uses results from an optical character recognition (OCR) process for translating the characters of Simplified Chinese to English words. When the translation process in step 132 is completed, the process proceeds to step 134.

In step 134, the process checks if the image processing bounding box has stayed on the same text in the current string as compared to the previous string. [The process of step 134 checks this by a process of either: a) comparing the similarity of character features in the current string for overlap to character features in the previous process string, or b) a tracking method to check stability of the current image and the previous image.] The process in step 134 calculates if the number of matched characters to number of total characters is high enough to confirm that the bounding box is staying on the same text. The process proceeds from 134 to step 136, where the current translation is compared to the previous translation. The better translation is saved and the inferior translation is deleted by the process at step 136. Each time flowchart 150 finishes a process string, the process proceeds back to the start of flowchart 150 and captures a new frame from the video. This process produces a recognized string and a corresponding translation is shown on the display of the mobile camera device.

Figure 2A:
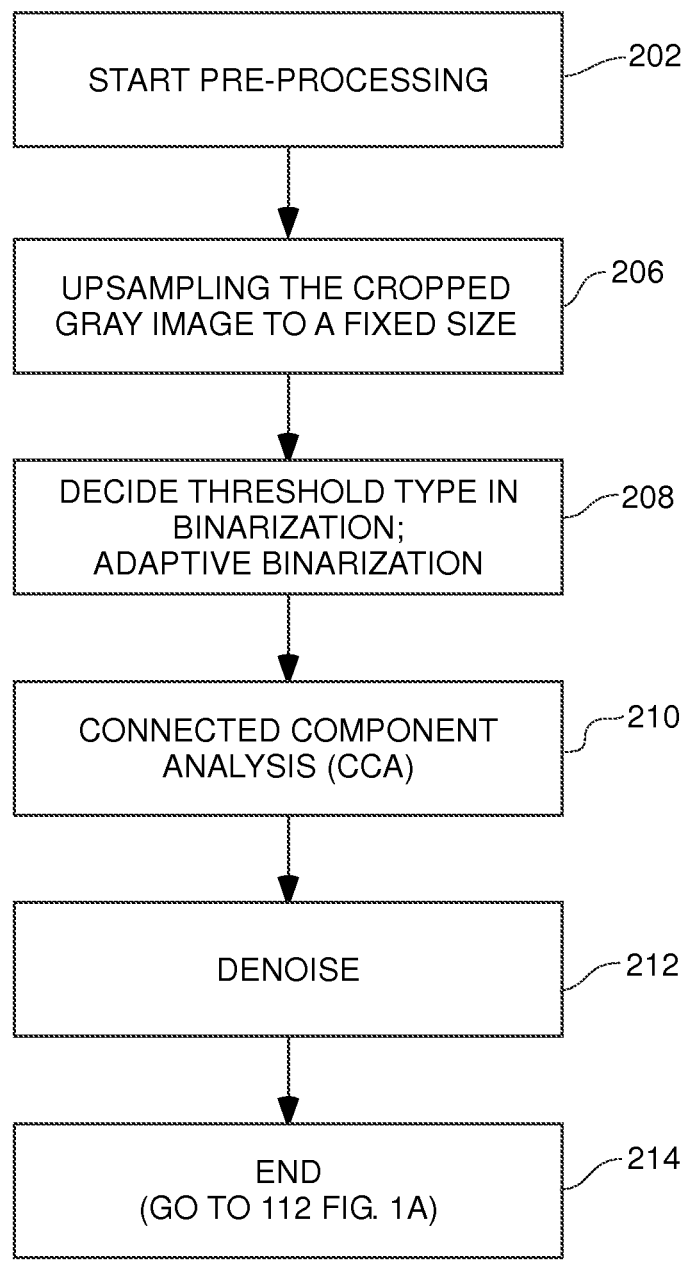
FIG. 2A illustrates a flowchart of a process for pre-processing cropped frames of the video feed in accordance with one embodiment of the present invention.

FIG. 2A illustrates a flowchart for a pre-processing process for character recognition starting at step 202. In step 202, a cropped greyscale image has been input from process step 110. Step 202 proceeds to step 206, where the cropped greyscale image is up-sampled to a fixed size, and then the process proceeds to step 208.

In step 208, the process performs a determination of the threshold type in the binarization of the greyscale image. The intensity values of text and background are utilized to determine if the threshold type is a dark background with light precursor characters, or a light background with dark precursor characters. To decide threshold type, the process determines the intensity values of pixels in each row. The process then compares a linear combination of the intensity values to determine the threshold type. After determining the threshold type in the binarization, the process at step 208 then proceeds to adaptive threshold binarization processing to compare intensity values of text and background to control for changes in lighting conditions over the area of the image, for example, those occurring as a result of a strong illumination or shadows. After determining the threshold type in the binarization and the binarization process, the process proceeds to step 210.

For processing in FIG. 2A and thereafter, as an alternative embodiment of the present invention, the processing of the cropped image from step 110 could be in a colorscale rather than in a greyscale. The translated words in English on the user interface of the mobile camera device could be presented in a font color selected from the group consisting of a red, an orange, a yellow, a green, a blue, a pink, a purple, and any other color combination(s).

In step 210, a connected component analysis (CCA) is performed to partition the binarized image of the process string into its segments. The connected components have fields of pixels that are either all black or all white. After the process has completed the connected component analysis (CCA), the process proceeds to step 212. In step 212, the process de-noises the binarized connected components by removing individual and small clusters of pixels by examining size and shape information of connected components, and then the process proceeds to step 214 which ends the process of flowchart 200 and returns the process string to step 112 in FIG. 1A.

Figure 2B:
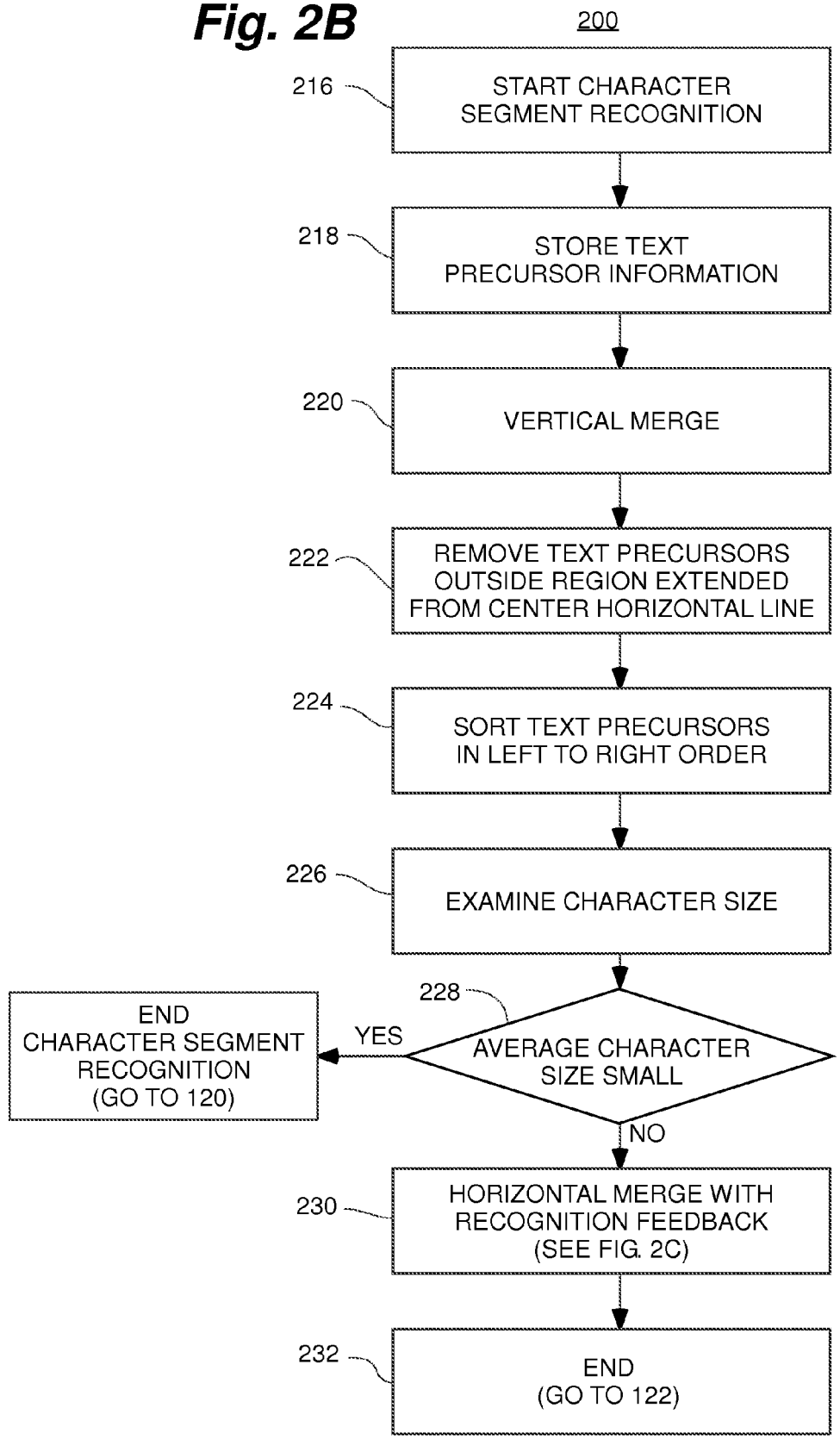
FIG. 2B illustrates a flowchart of a process for performing character segment recognition in accordance with one embodiment of the present invention.

FIG. 2B illustrates a continuation of flowchart 200 where the process of FIG. 2B starts a process of character segment recognition at step 216. The process proceeds to step 218, where text precursor information is stored in a memory device. From step 218, the process then proceeds to step 220 to perform vertical merging by identifying and combining the text precursors that are horizontally overlapping. Horizontally overlapping text precursors are separate text precursors having portions with different vertical coordinates but sharing common horizontal coordinates with respect to a center horizontal line of the image frame. In this case, close but separate text precursors having no overlapping horizontal coordinates will not be processed as sub-components of the same Chinese text character at this stage. After the process of vertical merging the text precursors, the process proceeds to step 222 to exclude the artifact text precursors which are outliers to the apparent single line of text precursors being processed in a single line.

In process step 222, processing is guided by three common properties of a single line of Chinese text. First, a Chinese text character has a square-like aspect ratio at the outer margins of sections of all segments in the character. Secondly, Chinese text characters have a similar vertical height. Thirdly, a single line of Chinese characters is always a proper straight single line of characters and so there will not be a Chinese character higher than another Chinese character in the single line of text. Therefore, the process in step 222 as a single line processes a single line of Chinese text with processing to delete any data for a text precursor outside the region extended from the center horizontal line, where in this region every row overlaps at least one text precursor in the current image string. Accordingly, after the process in step 222 has removed any artifact text precursors outside regions extending from the center horizontal line of the image frame in vertical aspect, the process proceeds to step 224. In step 224, the process sorts text characters in a left to right order, and then the process proceeds step 226, where character size is examined assuming Chinese characters have a square box shape overall. From step 226, the process proceeds to decision step 228, where the process determines if the average character size is small. If the process at step 228 determines that the average character size is too small, then the process ends character segment recognition and returns to step 120 of flowchart 150 in FIG. 1A. If the process at step 228 determines that the average character size is not too small, then the process proceeds to step 230.

In step 230, the process performs processing with horizontal merging using character recognition feedback on binarized vertically merged text precursors from step 228. The horizontal merging process starts on the leftmost text precursor in the single line. The process checks the bounding box shape for the text combinations across the text precursors and obtains a shape score for each of them. If an image processing bounding box has an aspect ratio to match the language profile, then the combination is processed in the character recognition feedback process illustrated in FIG. 2C (described below) to determine the distance scores of the combinations. The process selects the best combination of the text precursors having the best shape score and distance score, and then excludes this "object" and then repeats the horizontal merging with character recognition feedback processing on the nearest right object until there are no more rightmost objects in the single line image string. If none of the combined shape and distance scores is confident enough to be a character, then just one object is excluded. Many Chinese characters are composed of some other characters, so using shape information helps processing find the most likely character if the character itself and its sub-component distance scores are similar. This also solves the problem if characters in the string are close together and thus hard to segment. This "greedy" algorithm for segmenting a given string reduces computation requirements on mobile devices without having to compute a global optimal solution. When the process of step 230 is completed, the process proceeds to step 232, where the process is instructed to return to step 122 in FIG. 1B.

Figure 2C:
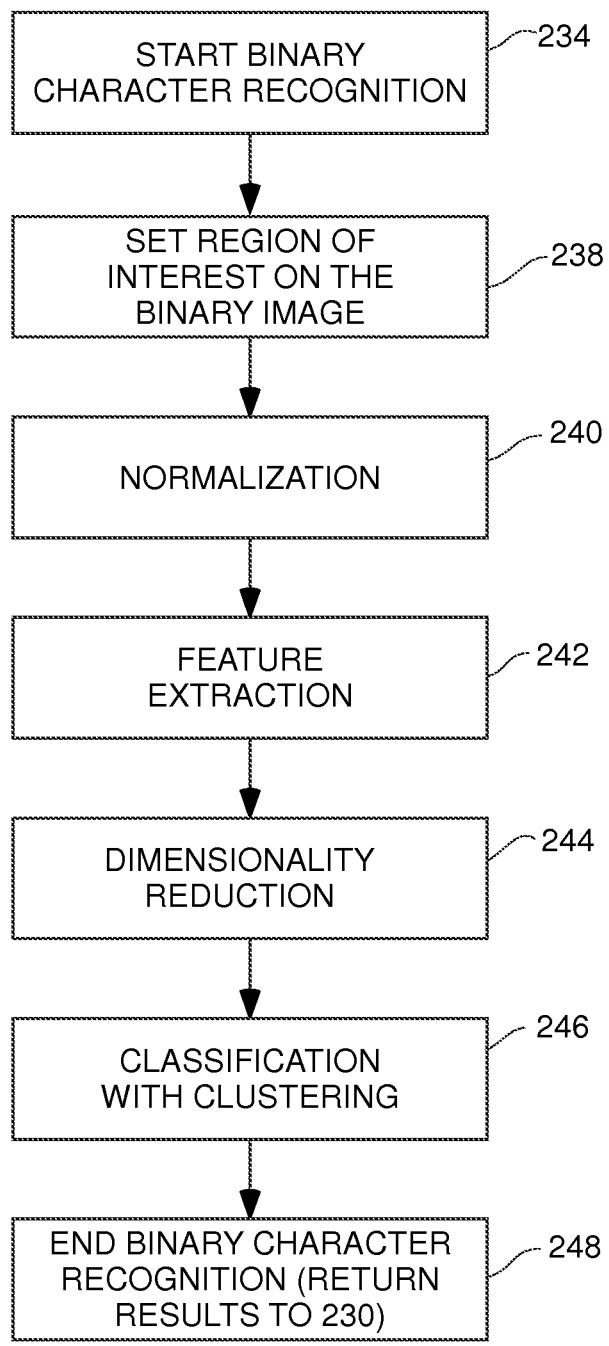
FIG. 2C illustrates a flowchart of a process for performing binary character recognition on horizontally merged character segment recognized frames in accordance with one embodiment of the present invention.

FIG. 2C illustrates a character recognition feedback process which functions as a subroutine that checks the suitability of horizontal merging processed combinations of text precursors, where the combinations of text precursors have been delivered from step 230 of FIG. 2B. The processing of combinations of text precursors from step 230 of FIG. 2B for the character recognition process starts in step 234 illustrated in FIG. 2C. The binary character recognition process in step 234 proceeds to step 238. In step 238, processing determines the regions of interest (ROI) on the binary image of the process string. The region of interest (ROI) on the binary image in step 238 comprises collections of connected components. The process in step 238 proceeds to step 240, where there is processing to cause image normalization. Normalization of the binary image is a process that regulates the shape of the image in the ROI to a fixed size to reduce the variation of images of same class. When the process of step 240 is completed, the process proceeds to 242 to perform feature extraction processing. The process of feature extraction transforms the input data into a set of features. The input data of the process string which is the normalized image data is very large. Thus, feature extraction is important for reducing the size of the data in subsequent processing steps of the algorithm. After processing to execute feature extraction of normalized region of interest, the character recognition process proceeds to step 244. In step 244, the process performs dimensionality reduction. Dimensionality reduction processing is used in step 244 to reduce the number of features to a more manageable number before classification. After dimensionality reduction, the process proceeds to step 246 for classification with clustering processing of the reduced character features. The process of classification with cluster processing causes agglomerative hierarchical clustering that finds pairs of clusters that merge by following paths in the classification graph of the clusters until the paths terminate in pairs of similar classes. Upon completion of step 246, the process proceeds to process step 248, which instructs the process string with recognized binary character data to return to step 230 of FIG. 2B.

Multi-Line Translation Embodiments

The present invention provides a multi-line text translation process using tracking and sub-sampled imaging. Multiline text recognition processing requires more computation to process a frame than single-line text recognition processing. To provide real-time user experience, the language translation is overlaid on text as an augmented reality image and a tracking method is used to detect movement of text. The tracking serves two purposes: one is to see if the camera is focusing on the same text. Image character processing is done only if two consecutive steady images are captured. Another purpose of tracking is to have moving direction of text so that text locations can be adjusted accordingly. For real-time tracking, the processing sub-samples the image before processing does tracking. Tracking is performed on the current frame and the previous frame, to obtain vectors with x and y movements. As users will usually focus on text on a flat area, processing determines if a user is holding the phone steadily by checking if the vectors are consistent and small. If the vectors are consistent and small, then character recognition can be performed using a captured video frame or by adjusting the text location on the screen.

To make translations overlay on the text in image in real-time, multi-threaded programming is used: text location tracking is done in a one thread while character recognition is done in another thread. The loop of going through tracking is very fast compared to recognition, thus text location can be adjusted in real-time. When the recognition results are ready, the recognition results are extracted, updated on the screen, and updated with text location. If necessary, another recognition in another thread is made. In this update previous results are examined and better results preserved for each text location.

The multi-line character recognition method performs: two-way binarization; horizontal blurring; an avoidance of recognition of video frames with unlikely character parts; text cancellation and horizontal line grouping. The multi-line process uses two types of binarization: dark text/bright background and bright text/dark background. Then horizontal blurring processing is used on the binarized images to detect horizontal text. This can be done efficiently and without possibly missing a text location. After horizontal blurring, text recognition is done on these regions. The regions that do not have proper size or aspect ratio are skipped to increase processing speed. Then, text cancellation is done to cancel one of the strings from different types of binarizations that overlap. If two strings overlap, the one is preserved that has more characters. Finally, text grouping is done if characters are separate and apart without being in the same region. Two regions of characters are grouped together according to the interval and location information.

Description of the processes of the multi-line process according to the drawings begins here. The decision process at step 104 in FIG. 1A sends a first frame of multiple line text for translation to step 106, where the process sends the first frame of the multi-lines of text to step 302 of FIG. 3A, where processing of the multi-line text translation process 300 starts. The process at step 302 proceeds to step 304 where the process crops the first frame of the multi-line text to remove the outer parts of the image frame in the image processing bounding box. The process then sends the first cropped frame of the multi-line text to step 306. In step 306, the process checks if the cropped frame is the first frame of the multi-lines of text. The cropped frame of multi-line text is the first frame, so the process sends the cropped first frame of multi-line text to step 308. The process of step 308 saves the first frame of multi-line text in a memory device. The process string at step 308 then returns to step 304. At step 304 the process crops a second frame of the multi-line text and sends the cropped second frame to step 306. The process in step 306 determines if the cropped frame is the first frame of the multi-line text. When the current cropped frame at step 306 is not the first cropped frame, and then the process at step 306 sends the cropped first frame and second frame of the multi-line text to step 310. In decision step 310 the process checks if the pause button on the user interface of the mobile camera device has been pressed. If the pause has not been pressed on the user interface, then the decision process at step 310 sends the first cropped frame and the second cropped frame to step 312. If the pause button has been pressed on the user interface, then the decision process at step 310 proceeds to step 380 where the process pause processing of the image from step 378 illustrated in FIG. 3B.

At step 312 the process performs resizing of the cropped image for both the previous and current frames before the process performs tracking on the cropped, resized previous frame and current frame. At step 312 the process performs tracking of the current and previous frames. In each of the tracking locations, the process calculates the changes in location of the image from the previous frame to the current frame and the process defines the movement from previous frame to current frame in each tracking location in terms of a vector with X and Y values. The process uses the previous frame as the reference tracking frame and processing ultimately proceeds only a current multi-line of text frame. The process proceeds from step 312 to step 314 where the vector results from the tracking at step 314 are examined.

Figure 3B:
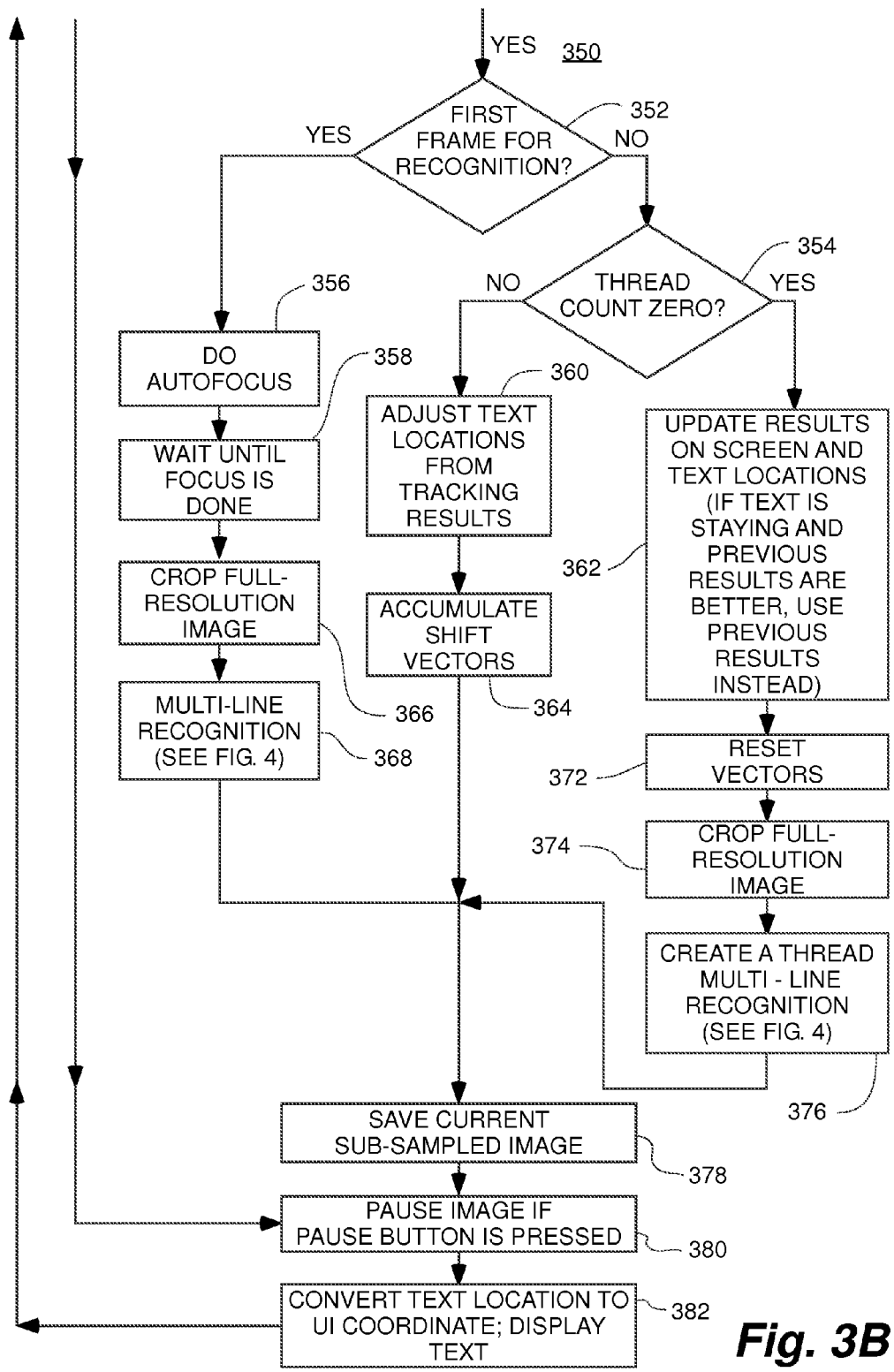
FIG. 3B illustrates process steps 352 to 382 of the flowchart of the process from FIG. 3A for translating multiple lines of a language in accordance with one embodiment of the present invention.

The process proceeds to decision step 316 where the vector results from the tracking are used to prevent processing unstable images with motion blurring. Processing at step 316 first determines (a) whether or not the vectors of the tracking locations are similar. Processing at step 316 also determines (b) whether or not the average vectors of the tracking locations accumulated between recognition result updates are small. In addition, processing at step 316 determines (c) whether or not the current image size matches the image size of the previous frame. When processing at step 316 indicates based on determinations (a-c) that there has been significant movement of current frame relative to the previous frame, then processing at step 316 sends both the current and previous frames of multi-line text to step 318. At step 318 the process deletes the current and previous frames of the multi-line text from memory and returns the process string to start step 302. Thus, the current frame is processed forward to step 352 as illustrated in FIG. 3B only if the process determines that: (1) the vectors of the tracking algorithm are consistently similar; (2) the average vectors of the tracked locations accumulated between recognition result updates are small; and (3) image size of the current frame matches the image size of the previous frame. When the process at step 316 sends the current frame process string to step 352, the process at 316 step discards the previous frame.

At decision step 352 a determination is made as to whether or not there has been a previous multi-line recognition result at step 368. If the process determines that there has not been a multi-line recognition result at step 368, then the process will send the multi-line text image frame for autofocusing at step 356. The process waits at step 358 until the focusing is completed. The process proceeds to step 366 where the process crops the multi-line text frame to obtain a full resolution image. After step 366, the process proceeds to step 368 where the focused and cropped multi-line text frame proceeds to a multi-line text recognition process which starts at step 402 in FIG. 4, which is described later. When there has been a multi-line recognition result at step 368 then at step 352, the determination will be that the current frame is not the first frame for multi-line recognition processing, and therefore the current frame will be sent to decision step 354 where the process decides if another thread is running or not.

Figure 4:
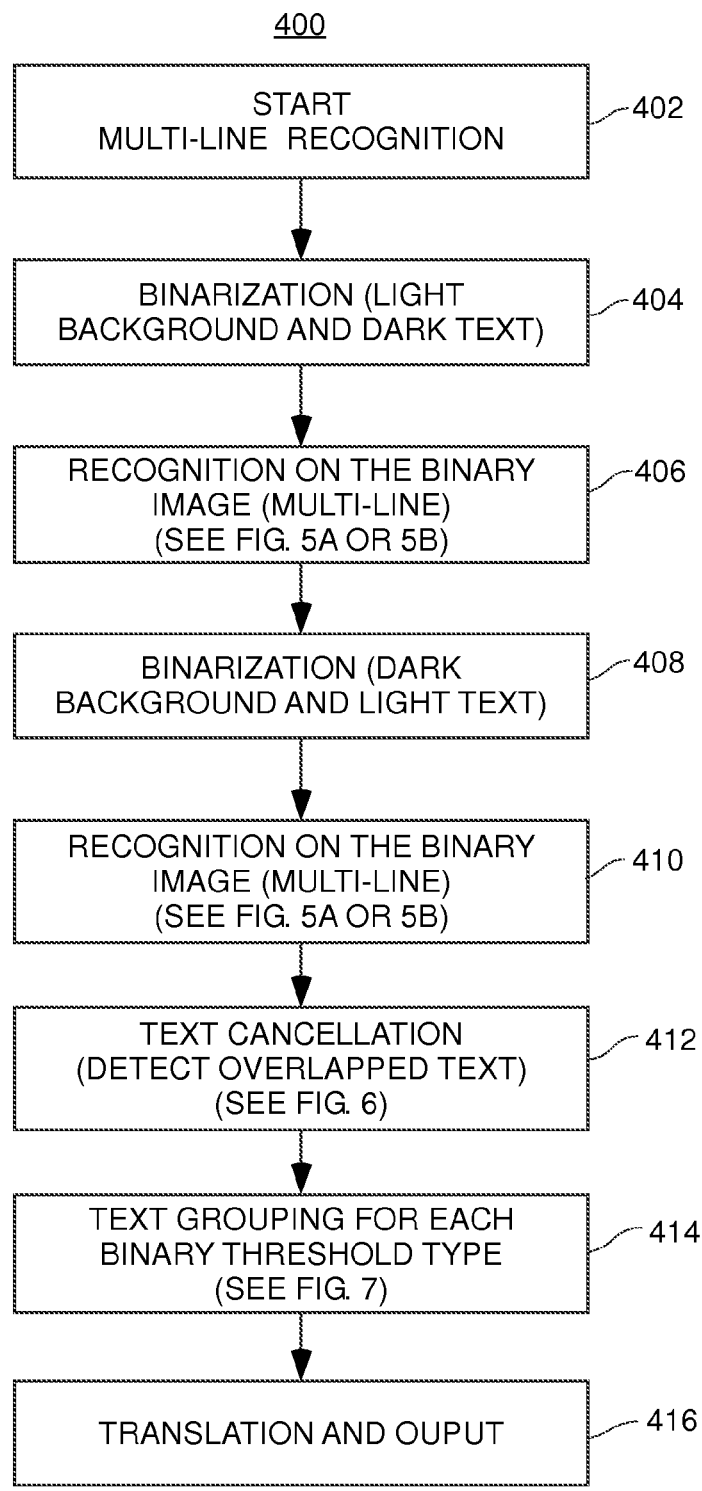
FIG. 4 illustrates a flowchart of a process for multi-line recognition of cropped frames of the video feed in the image processing bounding box as a subroutine at blocks 368 and 376 of FIG. 3B, in accordance with one embodiment of the present invention.

When the process at step 354 determines that the thread count is zero, then processing sends a current frame of the multi-line text image to step 362. The process in step 362 updates the translation text results displayed on the mobile camera device. Processing in step 362 checks each individual line of text separately in a frame of the multi-line text image; checks to see that text is staying in the bounding box; and checks to see whether previous translation results are better than current translation results and if so uses the previous frame translation results. After process step 362, the process proceeds to step 372 where the process resets the accumulated small tracking vectors to zero to avoid processing over-accumulation of vector data. The process proceeds to step 374 where the process crops the image frame to obtain a higher resolution image and then processing proceeds to step 376 where the thread is created for multi-line recognition processing as illustrated in FIG. 4. In step 378 the current image frame is saved. Note that current frame was cropped in step 304.

In step 354, when the determination is that the thread count is not zero then the process of step 354 proceeds to step 360 to adjust the text location from the previous frame of the translated text appearing on the image display of the mobile camera device. The adjustment uses the vectors calculation process for comparing the current frame to the previous frame and moves the translated text appearing on the image display of the mobile camera device, wherein the previous frame provided tracking results in step 312. After step 360, the process proceeds to step 364 where the shift vectors are accumulated from step 360.

Process pathways for multi-line text image processing from steps 368, 364, and 376 converge at step 378 where the current image frame is saved as a cropped multi-line text image. The process pauses image processing if the pause button has been pressed at step 380. The pause button is often pressed when a suitable translation has been obtained in order to be able to move the mobile camera device without losing the translation. The process of step 380 then proceeds to step 382 where processing matches the coordinates of the location of the screen with the location of the image buffer (memory) where the processing occurs. The process of steps 368 and 376 illustrated in FIG. 3B is a multi-line recognition subroutine process illustrated in FIG. 4 in process 400.

In more detail, process 400 begins in step 402. In step 404 the process performs a first type of binarization where there is a light background and dark text. The process at step 406 then performs recognition processing on the first-type binary multi-line image using either a subroutine process 500 illustrated in FIG. 5A which will be described later, or using the subroutine process 550 illustrated in FIG. 5B which will be described later. After the processing in process 500 or 550 is completed, the process returns to step 408 in FIG. 4 where the process performs a second type of binarization where there is a dark background and light text. The process at step 410 then performs recognition processing on the second-type binary multi-line image using either a subroutine process 500 illustrated in FIG. 5A or using the subroutine process 550 illustrated in FIG. 5B. After the processing in process 500 or 550 is completed, the process returns to step 412 in FIG. 4 where the process performs text cancellation to detect overlapped text using the subroutine process 600 illustrated in FIGS. 6A and 6B. After the processing in process 600 is completed, the process returns to step 414 in FIG. 4 where the process performs text grouping for the first type ("Type 1") binary threshold and text grouping for the second type ("Type 2") binary threshold. The step 414 is processed in a subroutine process 700 in FIGS. 7A and 7B that will be described later. After the text grouping for each type of binary threshold is completed, the process returns to step 416 in FIG. 4. The translation process in step 416 translates the Chinese characters, the text of the first language, into English words, the text of the second language, using results from optical character recognition. The output of the translation is displayed on mobile camera device as a real-time augmented reality image.

The translation engine in step 416 calculates a translation engine result scores. The translation engine score is high when there are signs that there has been good recognition of Chinese characters and a high probability of a good translation of the Chinese characters into English. After checking to see that the line of text of the current frame with respect to the previous frame is staying and not moving, then the multi-line translation engine score of the line for the current and previous frame translations are compared and when the previous translation engine score is higher, the previous frame translation of the line is retained and the current translation is not saved. The translation engine results are scored by calculating the perceived effectiveness of the translation result and then summing them across the resulting words. The translation process in the multi-line proceeds one line at a time in processing and translation of the multi-line text image.

In another embodiment vertical text recognition could be added as a process to the process of horizontal text recognition process. The processing would decide text direction automatically in both vertical and horizontal direction in the first frame recognition. The translation scores would be summed in each direction and the higher translation score would be selected for further processing because the higher score translation would have more meaningful phrases in that direction. Sometimes the process may have low translation scores indicating there are not many characters to be recognized for translation. Some translation scores may be simply noise. Therefore, the process would focus on summing the translation scores of text lines around the center of the image because that is where the user would start focusing.

Figure 5B:
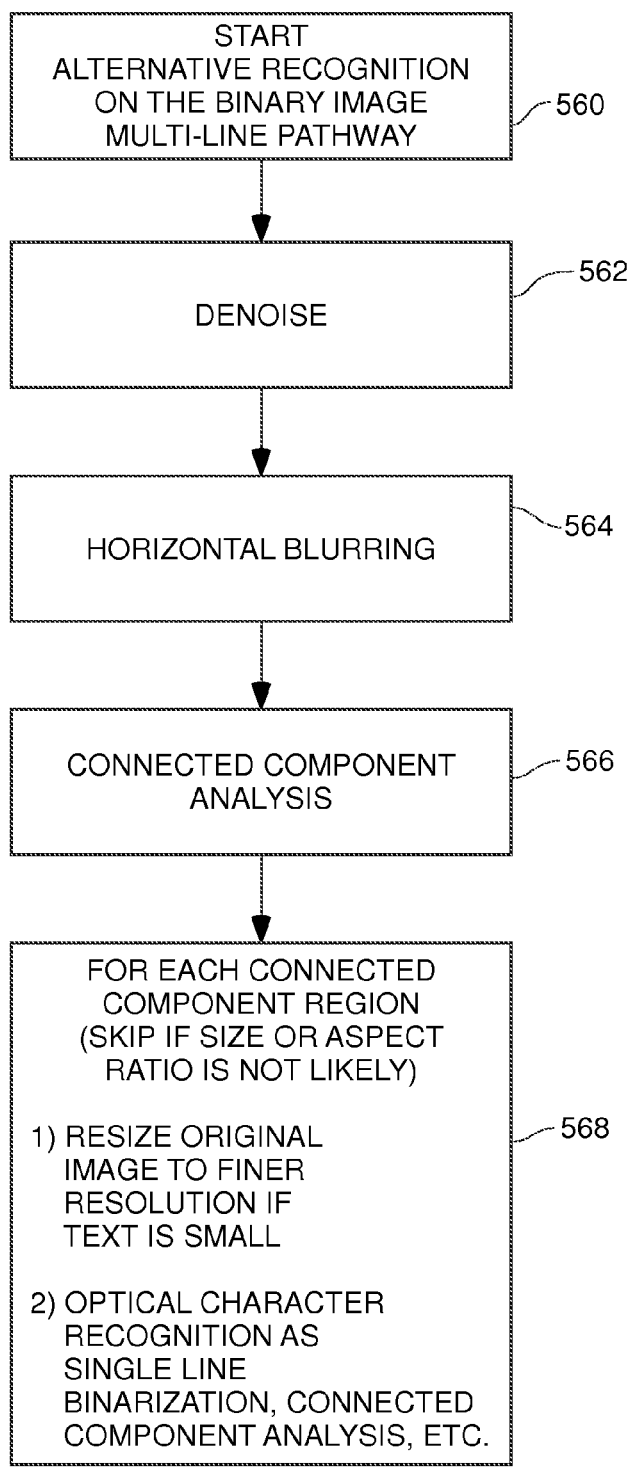
FIG. 5B illustrates a flowchart of an alternative process for multi-line recognition on a binary image having a light background and a dark text as a subroutine and for recognition on a binary image having a dark background and a light text in accordance with one embodiment of the present invention.

As mentioned above, the process at step 410 then performs recognition processing on the second-type binary multi-line image using either a subroutine process 500 illustrated in FIG. 5A or using the subroutine process 550 illustrated in FIG. 5B. Step 502 in FIG. 5A begins a process of recognition processing on one type of the binary multi-line image. This process proceeds to step 504 where the process finds connected components and de-noise the multi-line text image. The process then proceeds to process step 506 where horizontal blurring is performed to find text location.

The process then proceeds to step 508 where a connected component analysis is performed on the horizontally blurred image to partition the binarized image of the process string into its segments. The connected components have fields of pixels that are either all black or all white. After the process has completed the connected component analysis, the process proceeds to step 510 where the process performs an optical character recognition (OCR) on the connected components that are located inside each connected component single line region defined by horizontal blurring. Processing in step 510 will not do OCR on a single line region if the binary recognized characters are too small size or when the aspect ratio is unlikely to form a horizontal text line.

The alternative pathway 550 for recognition on the binary image multi-line image is illustrated in FIG. 5B and starts at step 560. In step 562 the binary image multi-line image is de-noised. The process proceeds to step 564 where horizontal blurring is performed followed in step 566 by connected component analysis with cropping of the corresponding regions in the original image. The connected component analysis is performed to partition the binarized image of the process string into its segments. The connected components have fields of pixels that are either all black or all white. After the process has completed the connected component analysis, the processing proceeds from step 566 to step 568 where for each connected component region like a single line, the process performs OCR unless the binary recognized characters are too small size or the aspect ratio is unlikely to form a horizontal text line. Then the process resizes each single line of the multi-line text image to a finer resolution and repeats the binarization. The process 550 of FIG. 5B has better accuracy than the process of FIG. 5A because the images being recognized have better resolution thus contain more details of characters but the processing speed may be slower than the processing in process 500 of FIG. 5A.

Figure 6A:
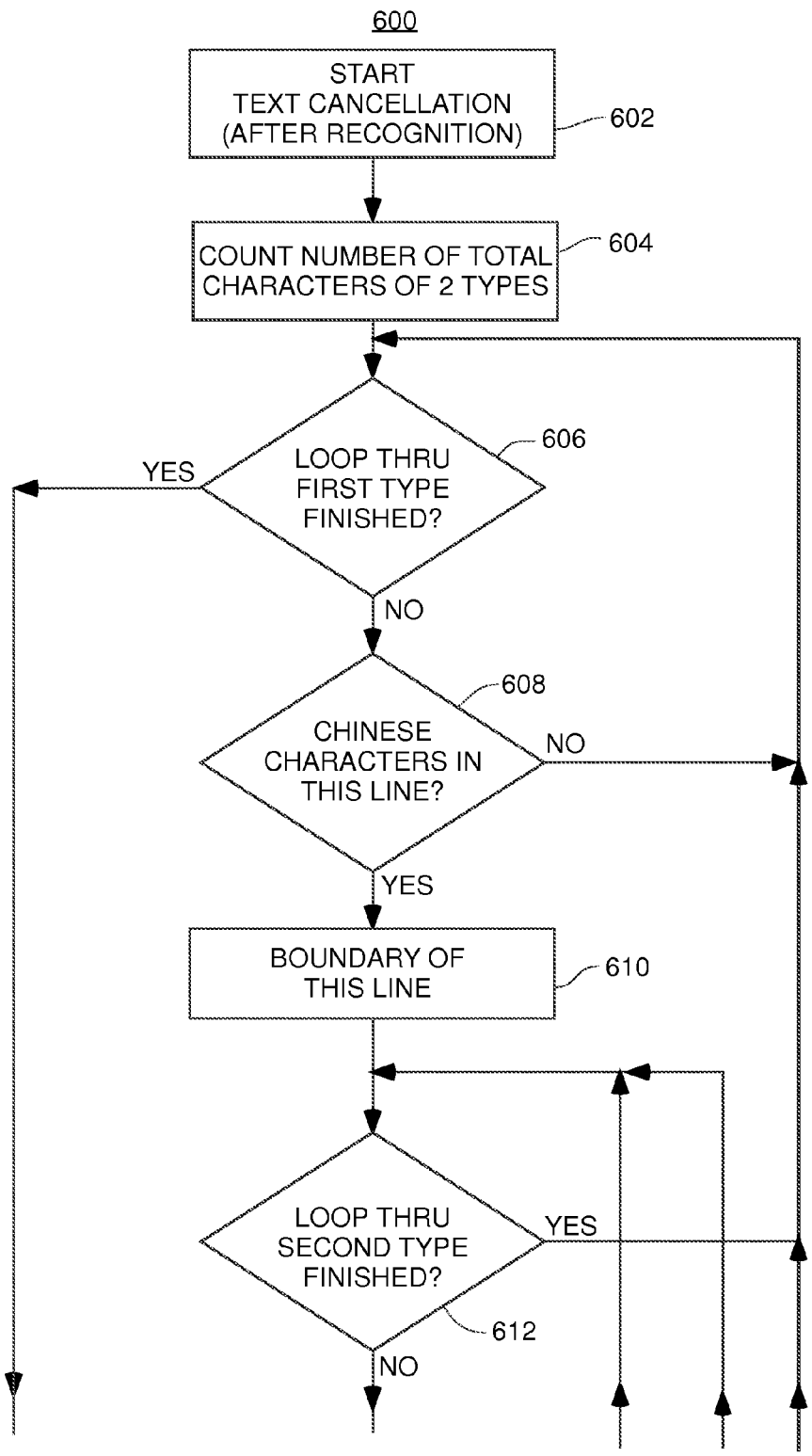
FIG. 6A illustrates process steps 602 to 612 of a flowchart of a process for performing a multi-line text cancellation after recognition on the binary image type with overlapping characters in accordance with one embodiment of the present invention.
Figure 6B:
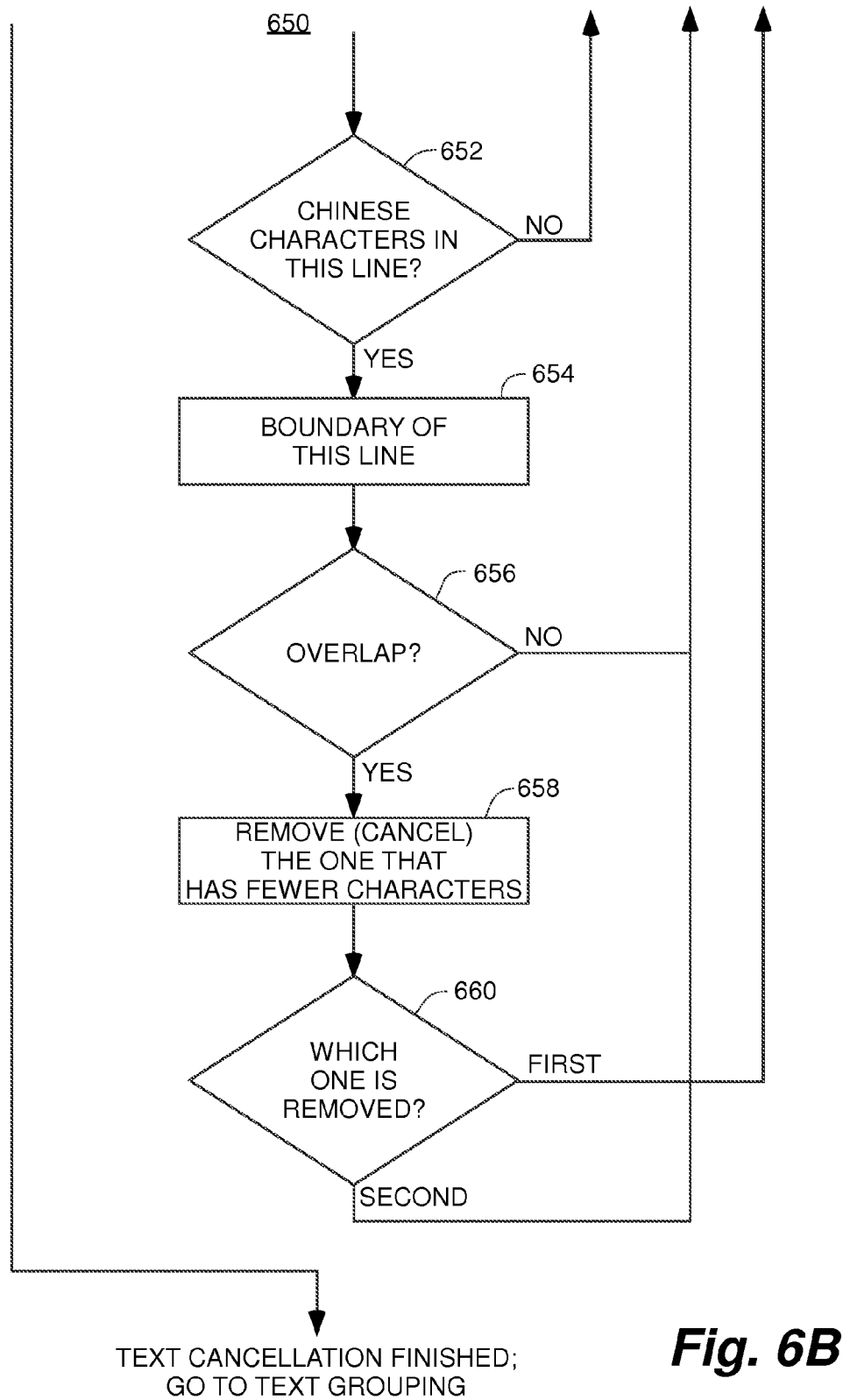
FIG. 6B illustrates process steps 652 to 660 of the flowchart of the process of FIG. 6A for performing a text cancellation after recognition on the binary image type with overlapping characters, in accordance with one embodiment of the present invention.

As mentioned previously, the process of FIG. 4 at step 412 performs text cancellation to detect overlapped text using the subroutine process 600 illustrated in FIG. 6 which has parts 6A and 6B. In process 600 of FIG. 6A, text cancellation after character recognition starts at step 602 and proceeds to step 604 where the process counts the number of characters in Type 1 binarization and in Type 2 binarization. By definition, if the Type 1 binarization consists of black text appearing on a white background, the Type 2 binarization is the opposite binarization, namely white text appearing on a black background. The process of step 604 proceeds to decision step 606 where there is a determination as to whether the processing loop thru the Type 1 binarization is finished. If the processing loop thru Type 1 binarization is finished, then the process string is sent to start text grouping at step 702 at the beginning of process 700 in FIG. 7A. If the processing loop thru Type 1 binarization is not finished, then the process proceeds to decision step 608 to determine whether there are Chinese characters in a single line of the multi-line text image frame.

If step 608 determines there are no Chinese characters in the line at step 608, then the process string is returned to step 606 to repeat the Type 1 binarization on another single line of the multi-line text image. If step 608 determines there are Chinese characters in a single line of the multi-line text image frame then the process proceeds to 610 to calculate the height and length bounds of the single line. The process in step 610 then proceeds to decision step 612 where the process determines if the processing loop thru the Type 2 binarization is finished. If the processing loop thru the Type 2 binarization is finished at step 612 then the process string returns to step 606 to process another single line of the multi-line text image. If the processing loop thru the Type 2 binarization is not finished at step 612 then the process string proceeds to step 652 in FIG. 6B. Step 652 is a decision step which determines whether there are Chinese characters in a single line of the multi-line text image frame. If there are no Chinese characters in this single line of the multi-line text image frame, then processing sends the process string to step 612 to repeat the Type 2 binarization on another single line of the multi-line text image frame. If there are Chinese characters in the single line of the multi-line text image frame, then the process proceeds to step 654 to identify the length and height boundaries of the particular single line of the multi-line text image frame.

The process of step 654 proceeds to decision step 656 where the step determines whether the strings of the Type 1 and Type 2 binarizations overlap. If the Type 1 and Type 2 binarizations do not overlap then the process returns to the decision step 612 process another single line of the multi-line text thru the Type 2 binarization process. If the Type 1 and Type 2 binarizations do overlap then the process at step 658 removes the string of the type of binarization that has the fewer characters. The process at step 658 uses the character number count for each of the type of binarizations from step 604 in FIG. 6A only when the number of characters of the two overlapped text lines are equal. The process of step 658 proceeds to decision step 660 to determine whether the string of the Type 1 binarization or the string of the Type 2 binarization was removed. If the Type 1 binarization was removed, then the process string is sent to decision step 606 to determine if the processing loop thru the Type 1 binarization is finished. If the Type 2 binarization was removed, then the process string is sent to decision step 612 to determine if the processing loop thru the Type 2 binarization is finished. When the strings of Type 1 are all looped through, then text cancelling is completed in FIGS. 6A and 6B and the process proceeds to process 700 at step 702 of FIG. 7A. As mentioned previously, the process of FIG. 4 at step 414 performs a text grouping process for each binary threshold type and this processing is performed in FIG. 7 which has parts 7A and 7B and is described below. A Chinese text character may be translated to a single English word. Two Chinese text characters or three Chinese text characters may need to be grouped for translation if they are wide apart. The process 700 illustrated in FIG. 7 determines text grouping on one single text line at a time in each multiline binarized text video image frame.

Figure 7A:
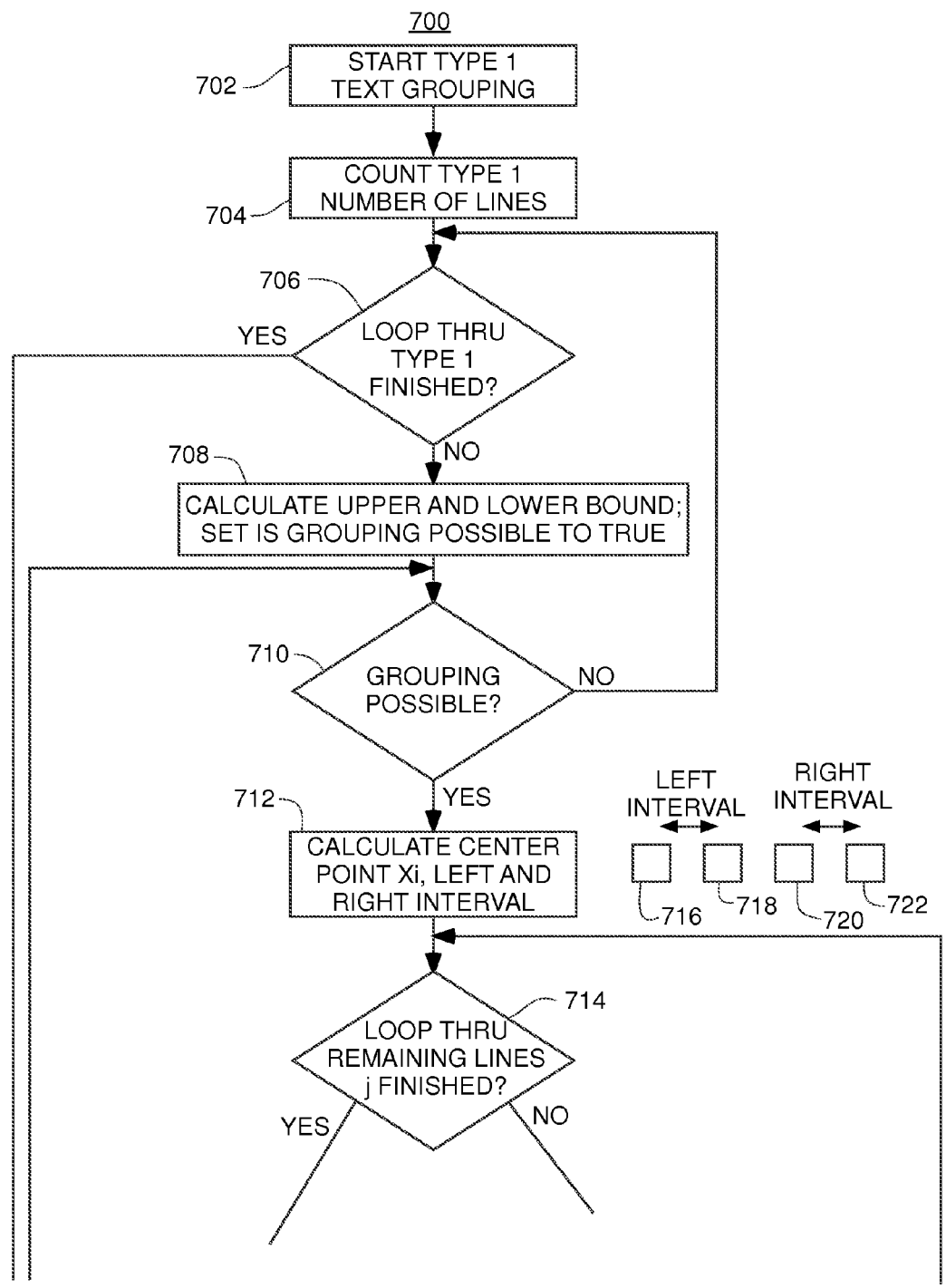
FIG. 7A illustrates process steps 702 to 722 of a flowchart of a process for performing multi-line text grouping for each binary threshold type in accordance with one embodiment of the present invention.

Process 700 of FIG. 7A begins at step 702 to start Type 1 binarized image text grouping. Processing in Step 702 proceeds to step 704 where the process counts the number of lines of text in Type 1. Process of step 704 proceeds to decision step 706 which determines whether the processing string has finished the Type 1 text grouping. When Type 1 text groupings has finished at step 706, then the process string is sent to perform Type 2. If the process at step 706 has not finished Type 1 text grouping, then processing continues to step 708.

In step 708 the process calculates the upper and lower bounds for the vertical range of a single Type 1 text line of the multiline text image frame. The process proceeds to decision step 710 to determine whether text grouping of Type 1 text should be performed. If the process at step 710 determines that text grouping of Type 1 text is not possible, then the process at step 710 returns the process string to step 706 to determine whether the loop thru Type 1 text grouping is finished. If the process at step 710 determines that text grouping of Type 1 text is possible, then the process proceeds to step 712 where the process calculates all of the location information for the Type 1 text characters in a single text line. The process first determines a center point Xi of horizontal position of the Type 1 text line and then the left interval of the two leftmost characters and the right interval of the two rightmost characters of the Type 1 text line. Note that in FIG. 7A, that the left interval is the distance between text character 716 and text character 718 depicted to right of step 712. Note that the right interval is the distance between text character 720 and text character 722 depicted to right of step 712. The process in 712 proceeds to decision step 714 where the process determines if the string process loop thru the remaining lines j is finished.

If the step 714 decision process determines the string process loop through the remaining lines j is finished, then the process proceeds to step 752 where processing modifies the location information of line i if grouping text to the right of center point Xi of line "i". Then the process proceeds from step 752 to step 756 where the processing modifies the location information of line i if grouping text to the left of center point Xi. The process then moves to step 760 to remove text line(s) being grouped and then the process proceeds to decision step 762 where processing at step 762 determines whether text grouping of the current line i occurred. If text grouping of line i did not occur then the text grouping of line i is set in memory as a false possible text grouping. If text grouping of line i did occur then the Type 1 text grouping process string returns to step 710 and since the possible text grouping is still set to true it will proceed to step 712 to find further possibility to group text line(s) into the current line i. (Inventors use the symbols "i" and "j" to indicate the text line we are focusing on. The process examines the possibility to group line "j" into line "i", so start with line "i" and loop through the remaining lines ("j") and then go to next line "i" and loop through the remaining lines ("j") and so on.)

If the step 714 decision step determines the string process loop through the remaining lines j is not finished, then the process proceeds to step 754 to calculate center point Xj of line j. (The decision step determines whether the center point Yj of line j is between upper and lower bounds of line i. If it is, then it proceeds to 754. If it is not, then it returns to 714.) The process then proceeds to decision step 758 where the process determines whether center point Xj of line J is less than center point Xi of line i. If decision step 758 determines that the center point Xj of line J is less than center point Xi of line I, then process proceeds to step 766 to calculate the left distance between left bound of line i and right bound of line j.

If decision step 758 determines that the center point Xj of line j is not less than center point Xi of line i, then process proceeds to step 764 to calculate the right distance between right bound of line i and left bound of line j.

After the process at step 766 has calculated the left distance between left bound of line i and right bound of line j. Then the process proceeds to decision step 768 where the process determines whether (1) either line i is a single Chinese character or the left distance is less than twice the left interval of line i; and (2) the left distance between left bound of line i and right bound of line j is less than the minimum stored value.

If the process at step 768 determines that the condition of either (1) or (2) above does not hold then the process string returns to step 714 to perform another decision as to whether the process string loop through the remaining lines j is finished.

If the process at step 768 determines that both the condition of (1) and (2) above hold then the process proceeds to step 776 to update the minimum stored value of left distance between left bound of line i and right bound of line j. Then the process string from step 776 proceeds to return to step 714 to perform another decision as to whether the process string loop through the remaining lines j is finished.

In the case where the decision step 758 determines that Xj is not less than Xi, then the process proceeds to step 764 where the process at step 764 calculates the right distance between right bound of line i and left bound of line j, then the process proceeds to decision step 770 where the process determines whether (3) either line i is a single Chinese character or the right distance is less than twice the right interval of line i; and (4) the right distance between right bound of line i and left bound of line j is less than the minimum stored value.

If the process at 770 determines that the condition of either (3) or (4) above does not hold then the process string returns to step 714 to perform another decision as to whether the process string loop through the remaining lines j is finished.

If the process at step 770 determines that both the condition of (3) and (4) above hold then the process proceeds to step 774 to update the minimum stored value of right distance between right bound of line i and left bound of line j. Then the process string from step 774 proceeds to return to step 714 to perform another decision as to whether the process string loop through the remaining lines j is finished.

Figure 7B:
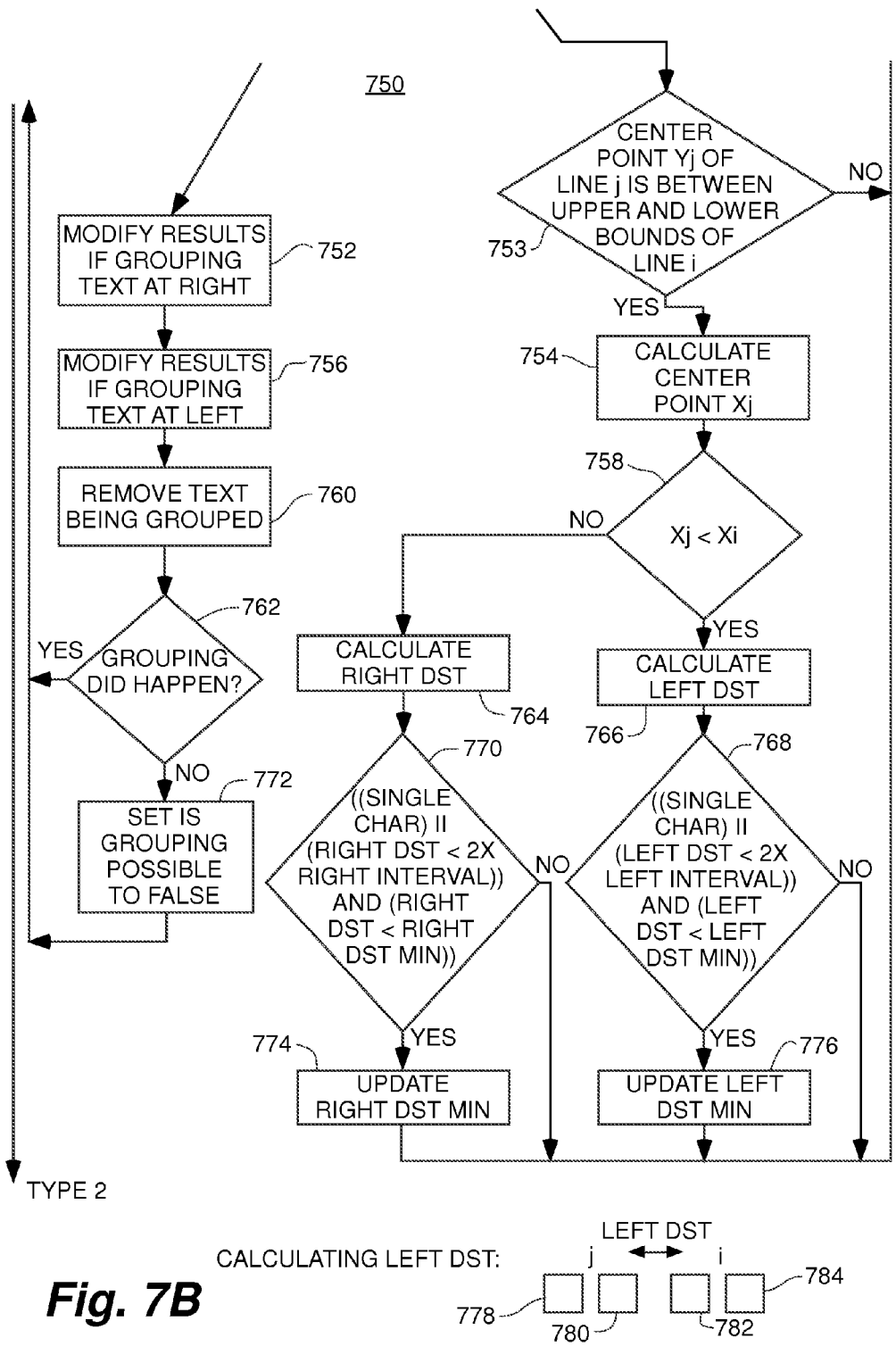
FIG. 7B illustrates process steps 752 to 784 of the flowchart of the process of FIG. 7A for performing multi-line text grouping for each binary threshold type in accordance with one embodiment of the present invention.

When decision step 706 in FIG. 7A has determined that Type 1 text groupings has been finished then Type 2 text grouping is performed according to the same kinds of processing steps of process 700 of FIG. 7A and FIG. 7B. However, the processing steps for the Type 2 text grouping are not illustrated specifically in the figures as it would be apparent what they would be to one of skill in the art to which the present invention pertains how to perform the Type 2 text grouping in view of FIG. 7A and FIG. 7B.

User Interface Embodiment and Use Cases

Figure 8:
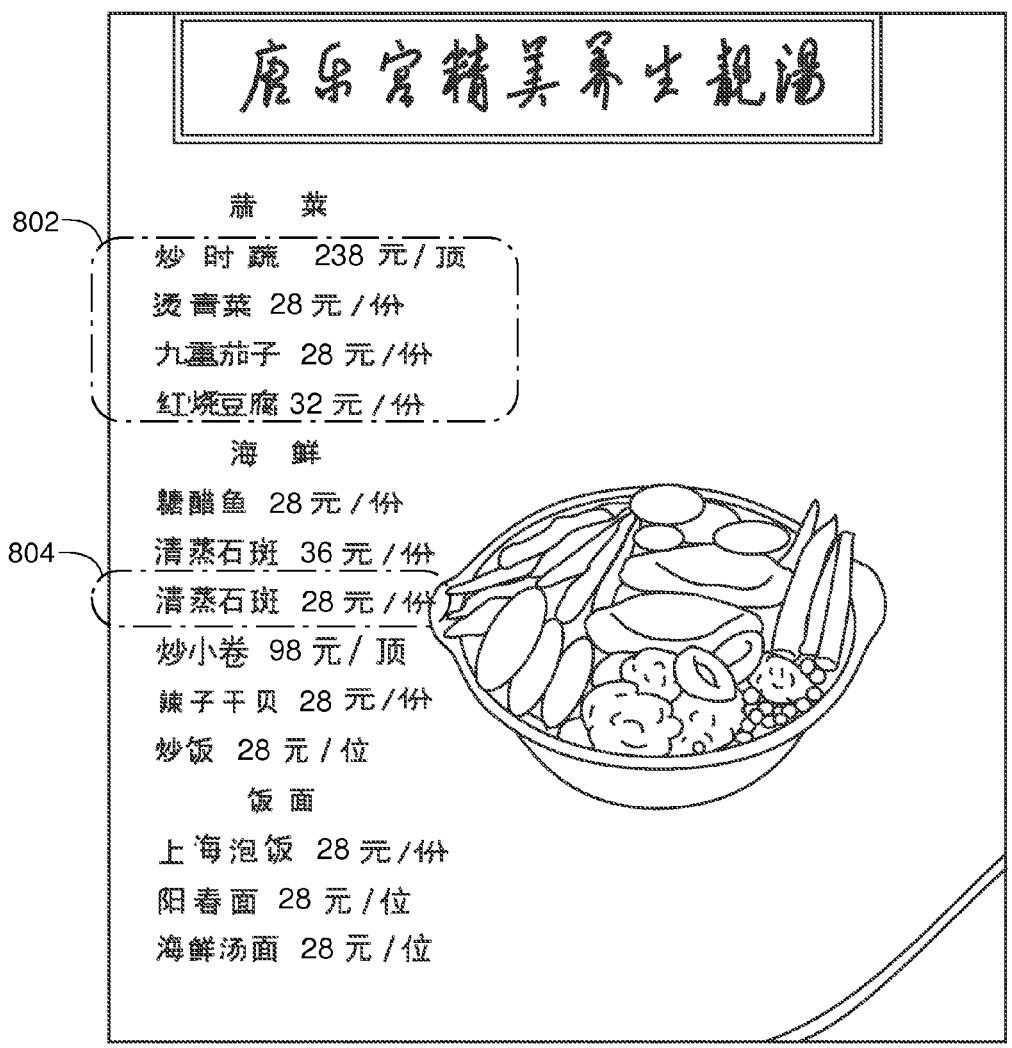
FIG. 8 depicts an illustrative Chinese restaurant menu with Chinese characters needing a multi-line language translation and a single line language translation, in accordance with one embodiment of the present invention.

FIG. 8 depicts an example of a Chinese food menu. Encircled with label 802 is four lines of Chinese language characters needing a translation into English. Encircled with label 804 is a single line of Chinese language characters needing a translation into English.

Figure 9:
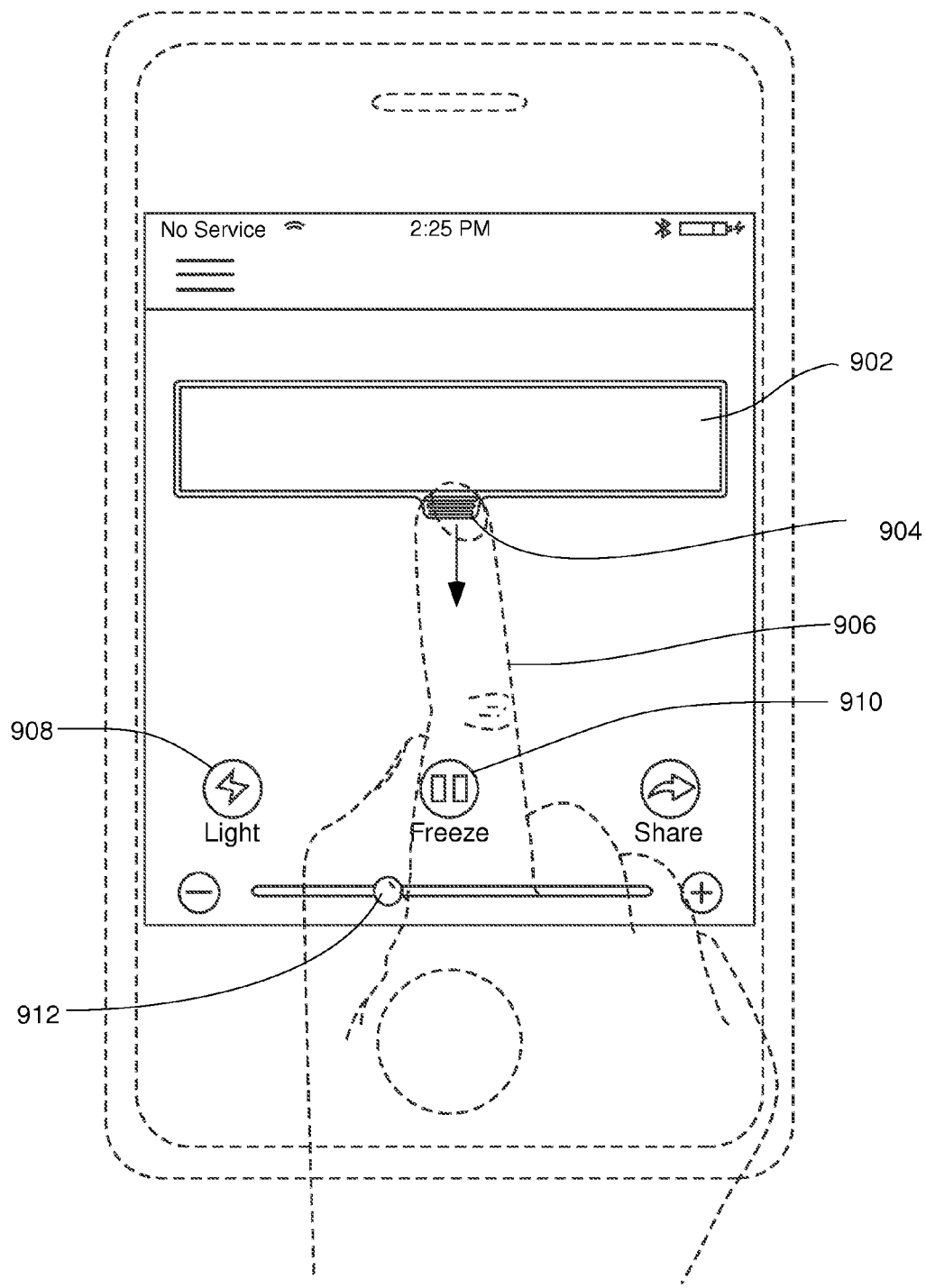
FIG. 9 depicts an example of a user interface of a mobile camera device being used to increase a size of a bounding box by touching fingertip to a tab icon at the bottom of the bounding box and sliding the fingertip downward, in accordance with one embodiment of the present invention.

FIG. 9 depicts a user interface 900 on an example of a mobile camera device that is on an operating process of an embodiment of the present invention. An embodiment of a target box 902 is depicted on the user interface display. The target box can be any size and located anywhere on the mobile camera device. Target box pull down display icon 904 depicted being touched by finger tip 906 which can slide in direction of arrow causes the target box to increase in size. Light illumination switch icon 908 labeled "light" can be tapped to add light illumination during camera focusing on the first language text selected for a translation into a second language. First language text will be displayed in target box. Pause button 910 labeled "freeze" can be tapped to pause or freeze a display of a translation. See FIG. 10 for example effect on size of target box caused by sliding a finger tip on pull down icon 904.

Figure 10:
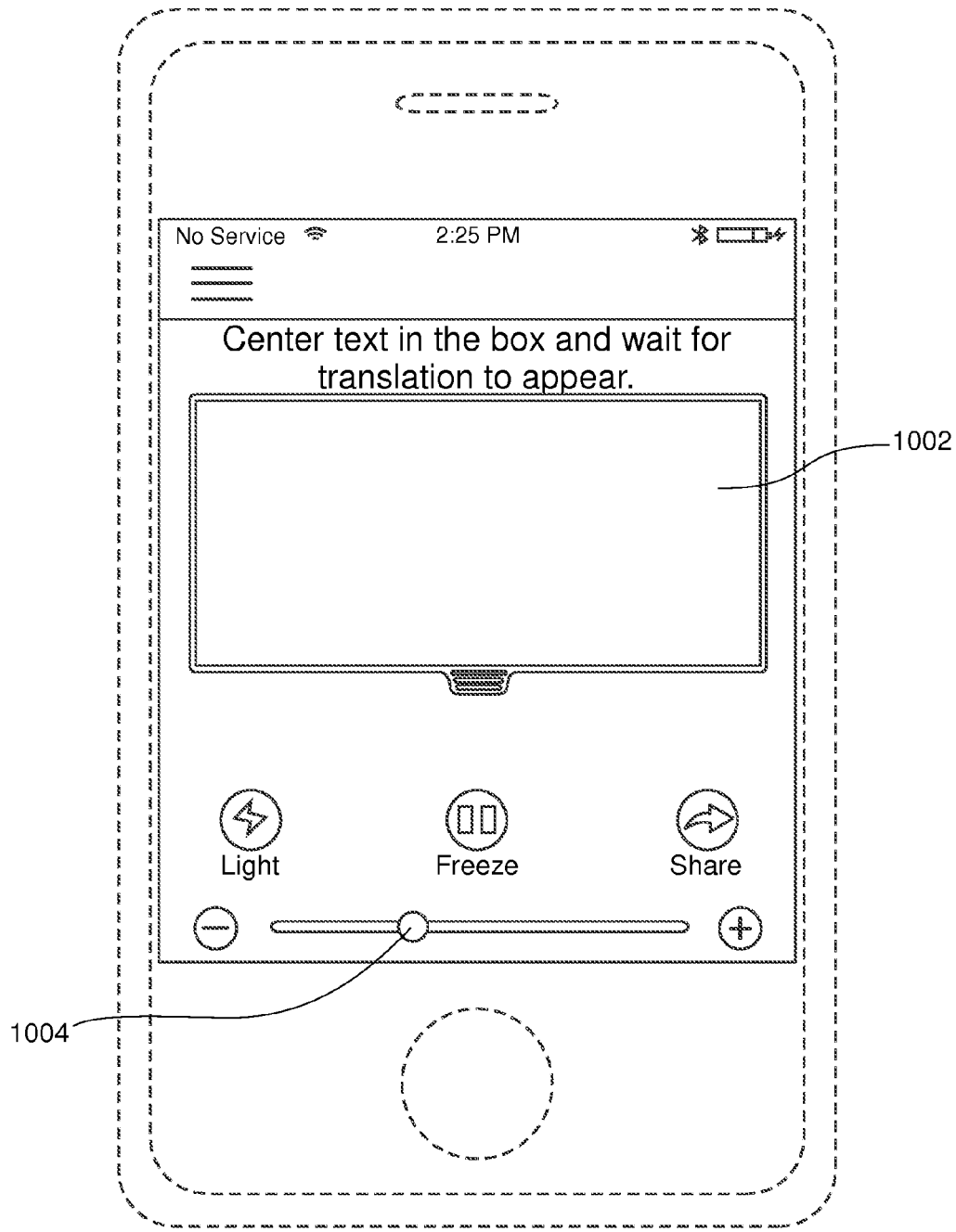
FIG. 10 depicts an example of a result of the activity depicted in FIG. 9 in that the size of the bounding box has been increased in FIG. 10 compared to FIG. 9, in accordance with one embodiment of the present invention.

FIG. 10 depicts a user interface 1000 on an example of a mobile camera device that is on an operating process of an embodiment of the present invention. An embodiment of a target box here labeled 1002 is depicted on the user interface display. Compared to target box 902 of FIG. 9, the size of the target box in FIG. 10 is larger. Above target box is an instruction "Center text in the box and wait for translation to appear". Slider icon 1004 has a button and can be slid to zoom the image in the target box as needed.

FIG. 11 depicts a user interface 1100 on an example of a mobile camera device that is on an operating process of an embodiment of the present invention. Target box size fits a single line of focused Chinese text characters 1104 for translation by the present invention. These are the same Chinese characters as depicted inside label 804 on Chinese menu depicted in FIG. 8. Above the target box is the single line processed image 1102 of Chinese characters. Below the target box is an English translation 1106. Pull down tab icon is labeled 1108. Pause icon is labeled 1110. Light illumination icon 1112 indicates the light is "off." Second view of user interface depicts a finger on a target box pull down icon 1114.

Figure 12:
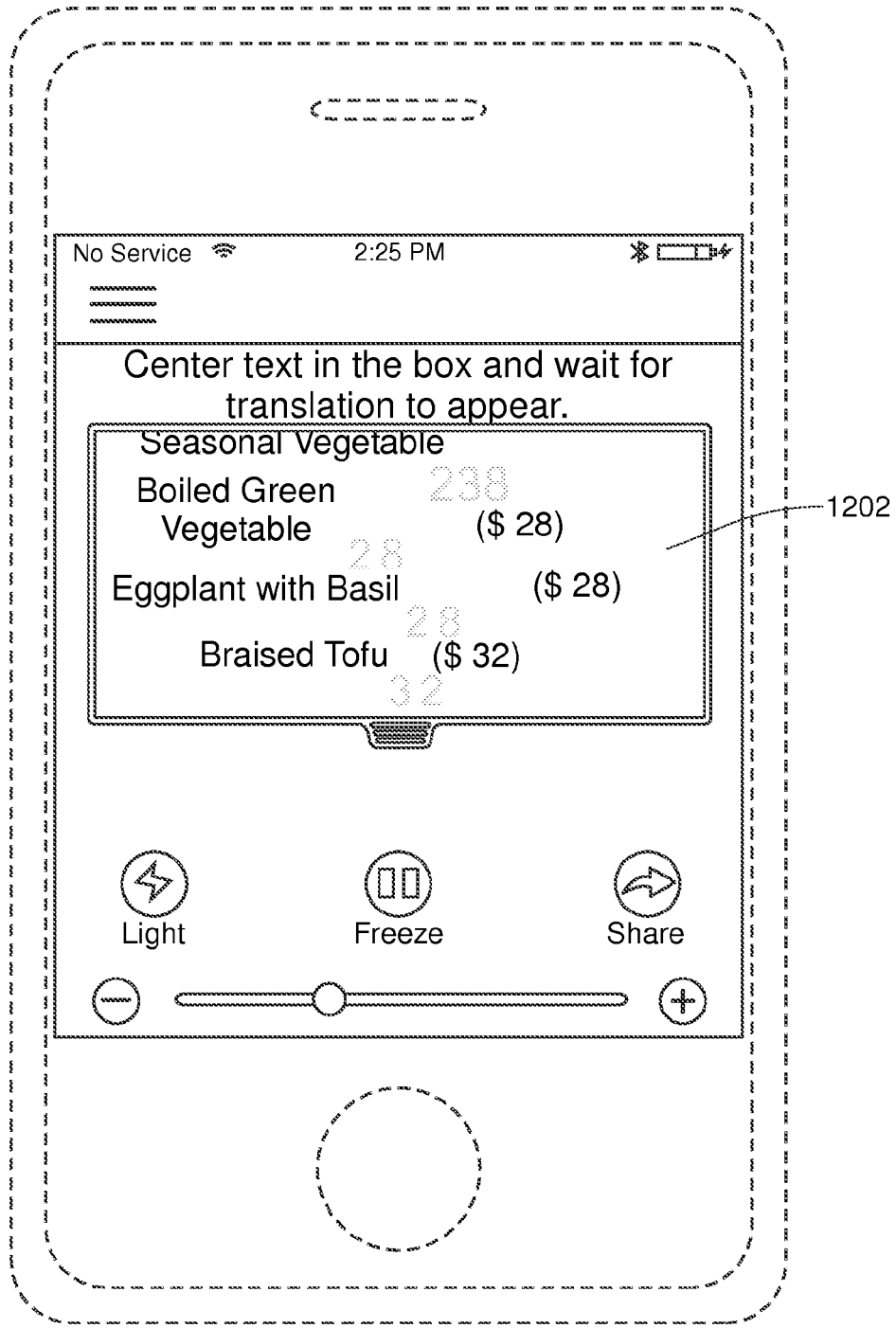
FIG. 12 depicts an example of a user interface of a mobile camera device displaying multiple lines of a translation of Chinese characters (faded) with an English translation (in bold) inside a bounding box, in accordance with one embodiment of the present invention.

FIG. 12 depicts a user interface 1200 on an example of a mobile camera device that is on an operating process of an embodiment of the present invention. Target box size fits four lines of focused Chinese text characters shown in very light grey inside the target box. The English translation 1202 is displayed inside the target box in this embodiment of the present invention with each line of Chinese characters and its English translation overlap. In one embodiment, the English translations are on top of the Chinese characters. In one embodiment, the English translation is displayed as an augmented reality image in real-time.

FIG. 13 depicts an expanded view of a user interface 1300, showing a zoomed-in portion of FIG. 12. The target box is labeled 1306 and the pull down icon tab 1312 in this example embodiment of the present invention. The first language text here is Chinese text characters. Their translation into the second language is displayed as English text characters. Each of the four lines of the multi-line translation are in an English text and each line is numbered here, for example lines 1302, 1304, 1308, and 1310. In one embodiment, the English text is in a black font, while the four lines of Chinese text are in a grey (original color) font in accordance with one embodiment of the present invention, but any color may be used for the font color. In other embodiments, the English text is in a white font color. The colors of foreign and translated text may be varied without departing from the spirit or scope of the invention.

Figure 14:
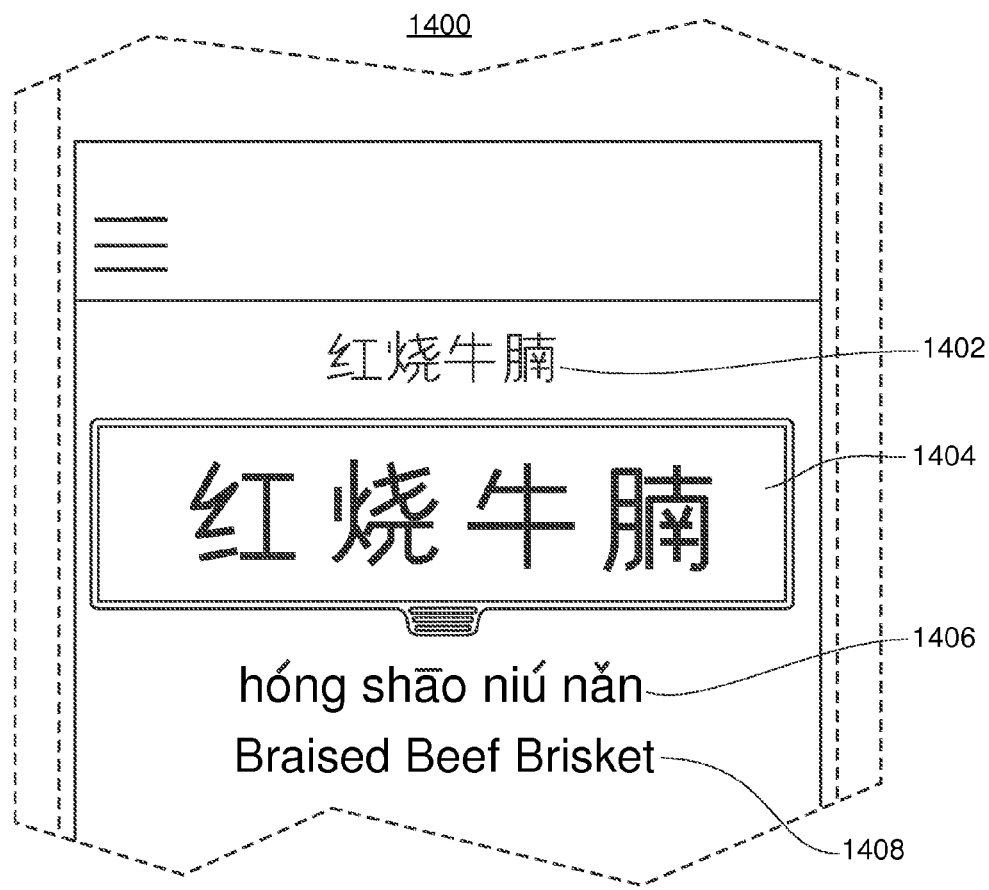
FIG. 14 depicts a portion of FIG. 12 which is displaying a pronunciation of the first language Chinese characters, in accordance with another embodiment of the present invention.

FIG. 14 depicts an expanded view of a user interface 1400 displaying a single line translation operation by another embodiment of the present invention. A Chinese pronunciation 1406 of the Chinese text characters 1404 is displayed below the target box. Target box size fits a single line of focused Chinese text characters 1404 for translation by the present invention. Above the target box is the single line processed image 1402 of the Chinese characters. Below the target box is an English translation 1408.

Figure 15:
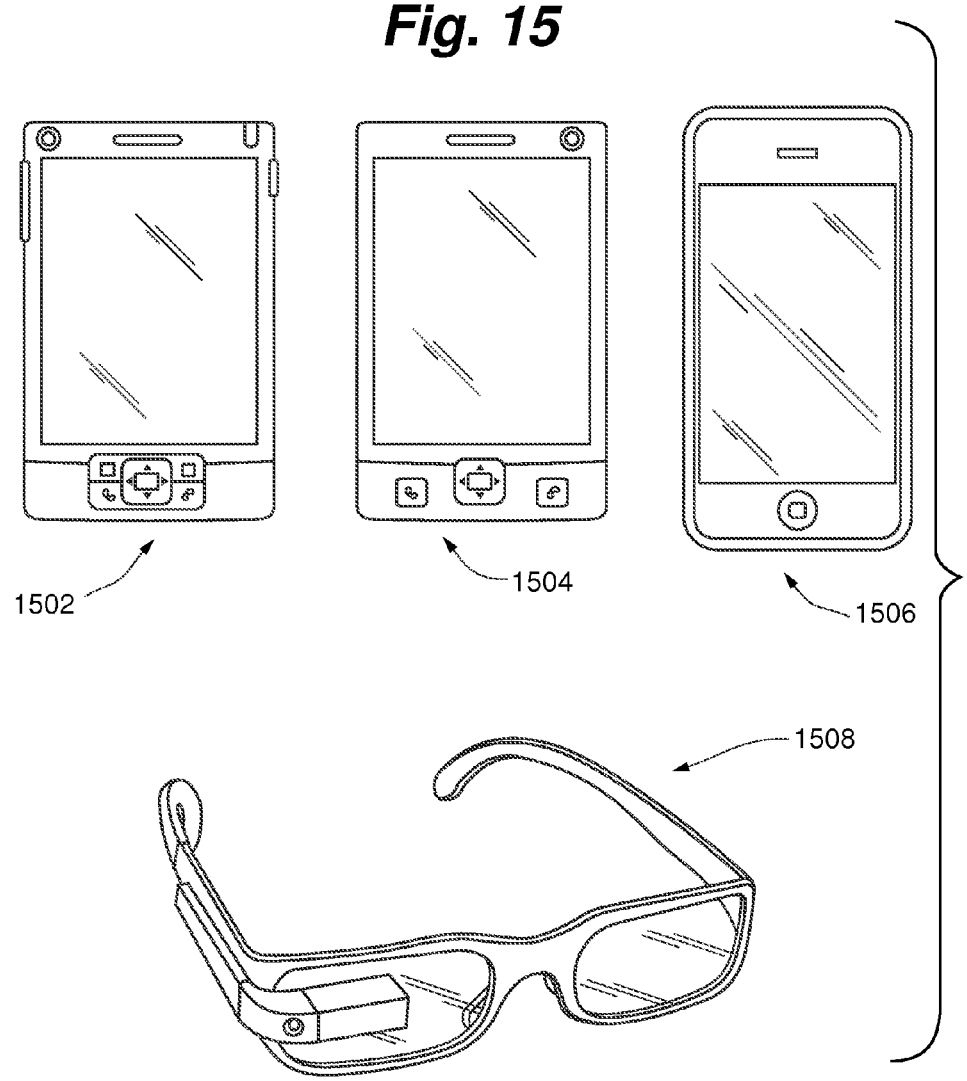
FIG. 15 illustrates various alternative end-user devices which may utilize embodiments of the present invention, including smart phones and wearable computers.

FIG. 15 shows various mobile devices 1502, 1504, 1506, and 1508 on which the present invention may be practiced. Shown are mobile smartphones 1502, 1504, and 1506, as well as a wearable computer 1508, such as, but not limited to, GOOGLE GLASS™. The present invention may be practiced on a variety of mobile and wearable devices, some illustrative examples of which are provided here. However, the applicability of the present invention is by no means limited to the mobile devices or wearable computers shown or described here. It is known that such mobile devices and wearable computers have one or more processors, coupled to one or more memories, which store program code, which may be used to store the program code to execute the processes of the present invention, as shown and described.

Vertical Language Text Translation Embodiments

Figure 16:
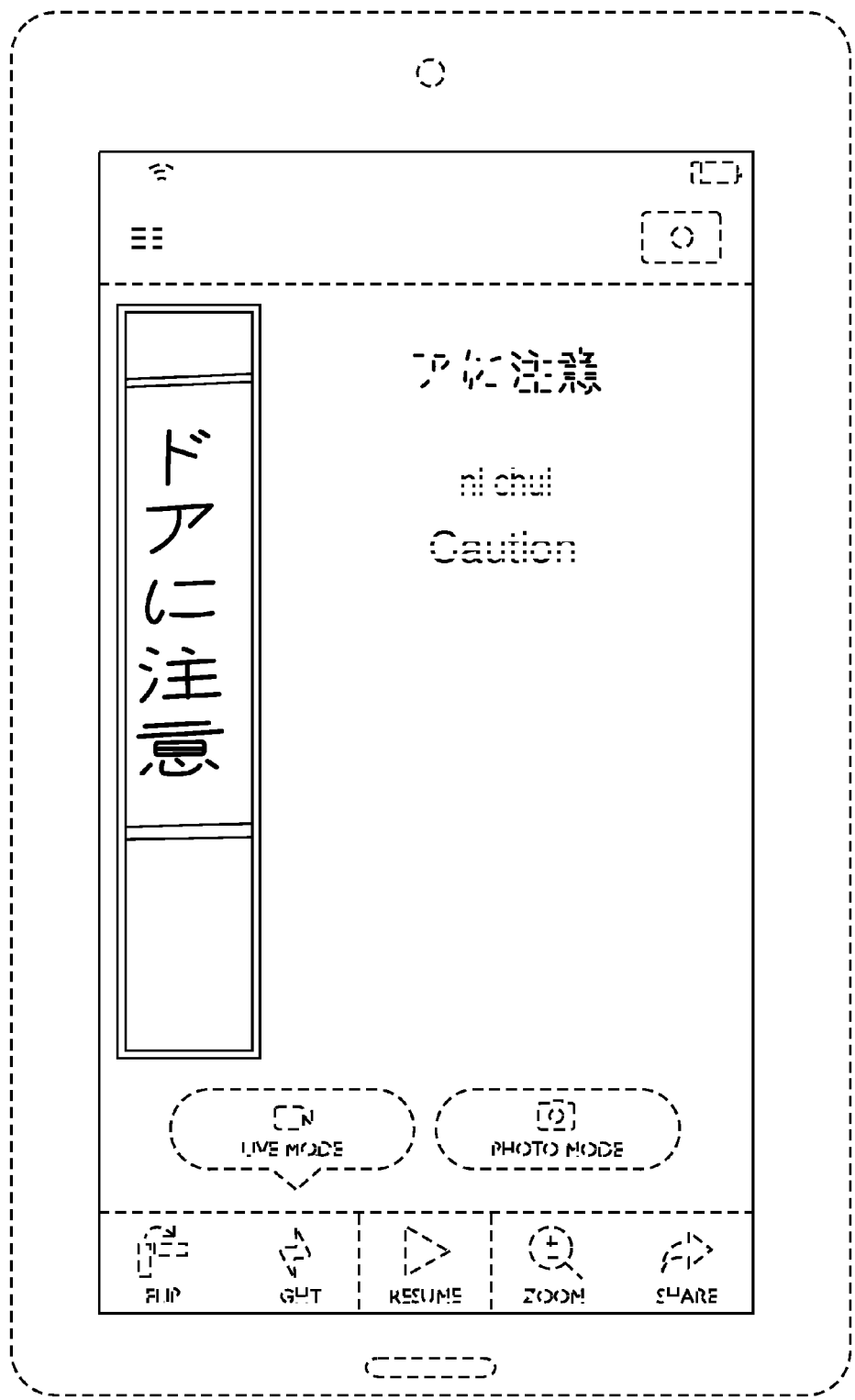
FIG. 16 shows a front view of a mobile device having a graphical user interface (GUI) with a vertical language text translation box, said vertical language text translation box on a left side, according to one configuration of the GUI.
Figure 17:
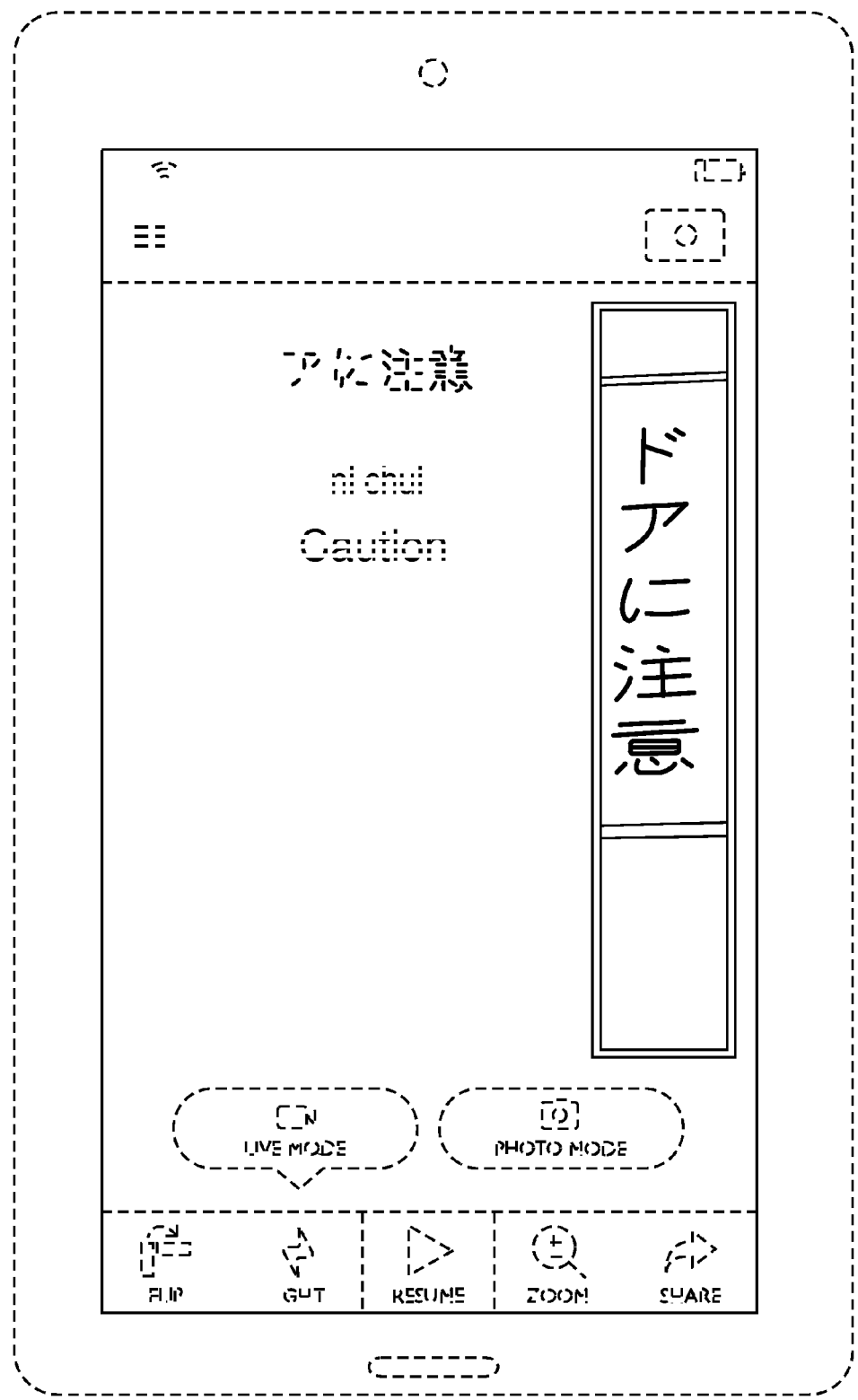
FIG. 17 shows another front view of the mobile device having the GUI with the vertical language text translation box, said vertical language text translation box on a right side, according to another configuration of the GUI.
Figure 18:
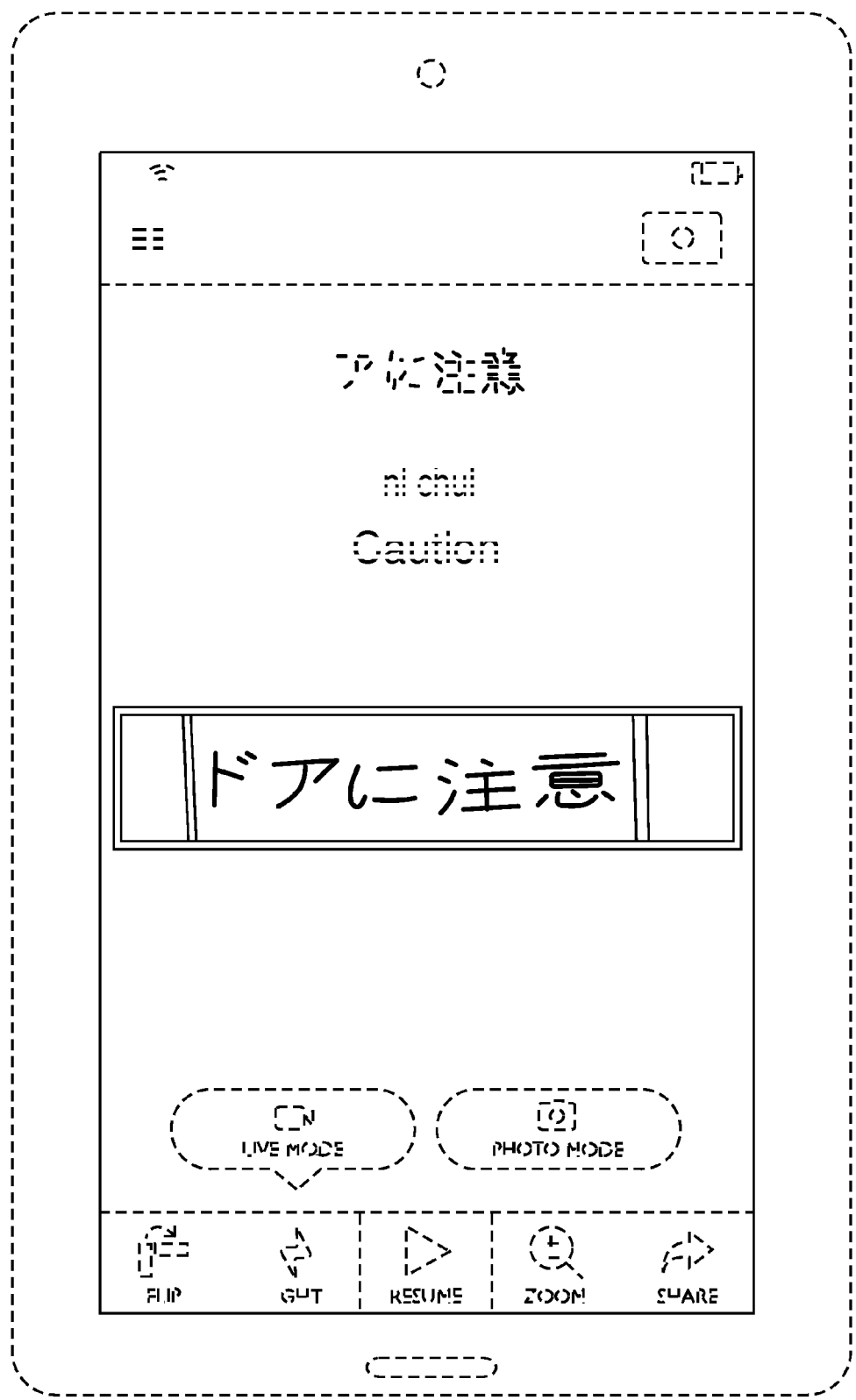
FIG. 18 shows yet another front view of the mobile device having the GUI with the language text translation box, said language text translation box rotated ninety degrees to be horizontal, according to yet another configuration of the GUI.

In some embodiments in which Asian text is being translated, and the Asian text is normally displayed vertically, embodiments of the present invention allow vertical text selection. This increases the simplicity and ease of use of the present invention, and greatly facilitates translations of Asian languages with vertical language text. Illustrative embodiments of a vertical language text selection interface on a mobile device are illustrated in FIGS. 16-18. However, these embodiments are illustrative of select embodiments, and are not to be read as limiting. The Japanese language text shown in FIGS. 16-18, showing a translation of the Japanese word for "caution," is illustrative only, and any foreign language text with vertically aligned characters may be used according to embodiments of the present invention. Furthermore, the exact location, placement, orientation, shape, and various other design features shown in FIGS. 16-18 are meant to be illustrative of various embodiments of the present invention, and are not to be read as limiting the scope of the present invention or its uses.

FIG. 16 shows a front view of a mobile device having a graphical user interface (GUI) with a vertical language text translation box, said vertical language text translation box on a left side, according to one configuration of the GUI.

FIG. 17 shows another front view of the mobile device having the GUI with the vertical language text translation box, said vertical language text translation box on a right side, according to another configuration of the GUI.

FIG. 18 shows yet another front view of the mobile device having the GUI with the language text translation box, said language text translation box rotated ninety degrees to be horizontal, according to yet another configuration of the GUI.

As shown in FIGS. 16-18, in some embodiments of the present invention, the vertical language text selection box can be rotated by 90 degrees, automatically rotating the foreign language text inside the box, to facilitate reading by a non-native speaker. In some embodiments, there is provided on the GUI an icon that allows the switching between vertical and horizontal text selection boxes. In some embodiments, the foreign language text is simultaneously rotated, while in other embodiments, the text inside the selection box is not rotated, for example, in cases where the foreign language text is already written horizontally. In yet other embodiments, activation of an icon on the GUI allows the selection between a single-line vertical box as shown in FIGS. 16-17, and a multi-line horizontal text selection box, as shown in FIGS. 9-10 instead, allowing instead a multi-line horizontal text selection. Finally, in yet other embodiments, a multi-column vertical text selection box is provided, and a further icon in the GUI (icon not shown) is provided that allows selection between single-column of vertical text, and multiple columns of foreign text.

As shown in FIGS. 16-18, in some embodiments, an icon is provided to turn the camera light on the mobile device on or off, an icon is provided to pause a live video stream or to resume the live video stream, an icon is provided to zoom into the live video stream, and an icon is provided to share the data, screenshot, and/or video with third-parties over a social or other network. Also as shown in FIGS. 16-18, in some embodiments icons are provided to select between live video mode and/or photo mode. Various other icons may or may not be displayed, which when activated may perform one or more other actions, as would be known to one of ordinary skill in the art. Standard status indicator icons, such as flash status, battery level, signal level, etc. there may or may not also be displayed, as would be recognized by one of ordinary skill in the art. Finally, in some embodiments, in the space next to the vertical language text selection box, may or may not be displayed the following information: a) the vertical language text rotated 90 degrees and displayed horizontally, b) a native pronunciation of the foreign language text in appropriate phonetic symbols and/or c) a translation of the foreign language text into a native language.

Embodiments with Similar Appearing Characters

Due to the fact that there are three different writing systems in Japanese, for example, (hiragana, katakana, and kanji), a few characters across these systems can be hard to distinguish on character level, such as (∧ versus ∧), (▫ versus ▫), etc. Therefore, in some embodiments, the process according to the present invention uses contextual information (surrounding text, etc.) to distinguish these variants. The process utilizes a language model and some heuristic rules to achieve higher accuracy. The process can also incorporate shape similarity information of characters along with translation scores to evaluate the most probable string. This may be useful in other languages.

CONCLUSIONS

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor.

The hardware operates under the control of an operating system, and executes various computer software applications, components, programs, codes, libraries, objects, modules, etc. indicated collectively by reference numerals to perform the process techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media, including over wireless media through online stores, sometimes known as "App Stores" for mobile devices.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method for providing one or more translations in a real-time video feed of a first language into a second language, comprising:
    providing an interface for selecting a vertical language text translation box corresponding to one or more words in the first language, wherein the first language is an Asian language comprising a plurality of characters having a vertical alignment;
    cropping a frame of the real-time video feed of the one or more words of the first language to fit inside the vertical language text translation box to produce a cropped frame;
    performing character segment detection on the cropped frame to produce a plurality character segments;
    performing character merging on the character segments to produce a plurality of merged character segments;
    performing character recognition on the merged character segments to produce a plurality of recognized characters;
    performing one or more translations on the recognized characters of the first language into one or more translated words of the second language; and
    displaying the translated words of the second language in augmented reality in the real-time video feed.

2. The method of claim 1, further comprising additional pre-processing steps before the step of performing the character segment detection, the pre-processing steps comprising:
    deciding a threshold type and performing binarization on the cropped frame to produce a binary frame;
    performing connected component analysis on the binary frame to produce analyzed connected components; and
    de-noising analyzed connected components in the binary frame before performing the character segment detection on the binary frame.

3. The method of claim 2, further comprising:
deciding whether a text precursor is detected after performing the pre-processing steps on the cropped frame before proceeding with the step of character segment detection.

4. The method of claim 1, wherein the step of performing the character segment detection comprises additional steps of:
storing text precursors in a memory device;
performing merging of any two text precursors when the two text precursors are overlapping and/or neighboring;
examining the text precursors' character size; and
ending character segment detection for small text precursor characters.

5. The method of claim 1, wherein the step of performing the character merging further comprises:
performing vertical and/or horizontal merging on the character segments with recognition feedback to produce the plurality of merged character segments.

6. The method of claim 1, wherein the step of performing the character recognition on the merged character segments comprises additional steps of:
setting a region of interest on the merged character segments;
normalizing the region of interest of the merged character segments to produce a normalized ROI;
performing feature extraction on the normalized ROI to produce extracted features;
performing dimensionality reduction on the extracted features to produce dimensionally reduced features; and
performing classification on the dimensionally reduced features.

7. The method of claim 1, wherein the step of performing the character recognition further comprises:
calculating a recognition distance score for the merged character segments; and
combining the recognition distance score and a shape score into a combined score for the merged character segments to produce a recognized character with a high combined score.

8. The method of claim 1, wherein the step of performing the one or more translations further comprises:
processing the recognized characters through a translation engine to produce the translation of the recognized characters in the first language into the one or more translated words of the second language, while calculating a translation engine score representing how many and/or how well characters have been translated for each translated line.

9. The method of claim 1, wherein the first language is selected from the group consisting of Chinese, Korean, Japanese, Vietnamese, Khmer, Lao, and Thai.

10. The method of claim 1, wherein the first language is Chinese or Japanese, and the second language is English.

11. The method of claim 1, further comprising:
utilizing a conversion table for converting dialects of the first language into a smaller number of dialects of the first language before translating the first language into the second language.

12. The method of claim 1, wherein the second language is selected from the group consisting of English, French, Spanish, German, Italian, Portuguese, Russian, Hindi, Greek, Hebrew, and Arabic.

13. The method of claim 1, further comprising:
moving the one or more translated words of the second language when a mobile device is moved without recalculating the one or more translations.

14. The method of claim 1, further comprising:
pausing the one or more translations which are displayed to allow a movement of a mobile device without changing displayed language translation.

15. The method of claim 1, further comprising:
displaying a phonetic pronunciation of the one or more words of the first language being translated.

16. The method of claim 1, wherein a translated line having a highest translation quality is selected for display, and wherein the translation quality is determined by how many and/or how well the one or more words of the first language are translated.

17. The method of claim 1, wherein the step of performing character merging on the character segments to produce the plurality of merged character segments further comprises:
determining at least a shape score for at least one merged character segment.

18. The method of claim 17, wherein the step of performing character recognition on the merged character segments further comprises:
utilizing at least the shape score of the at least one merged character segment to produce the plurality of recognized characters with high scores.

19. A mobile device for providing one or more translations in a real-time video feed of a first language into a second language, the mobile device comprising:
a video camera for capturing the video feed of one or more words in the first language which need translation;
a display for displaying the one or more words of the first language and one or more translated words of the second language;
a processor for processing program code; and
one or more memories operatively connected to the processor for storing the program code, which when executed by the processor causes the processor to execute a process comprising steps of:
providing an interface for selecting a vertical language text translation box corresponding to the one or more words in the first language, wherein the first language is an Asian language comprising a plurality of characters having a vertical alignment;
cropping a frame of the real-time video feed of the one or more words of the first language to fit inside the vertical language text translation box to produce a cropped frame;
performing character segment detection on the cropped frame to produce a plurality character segments;
performing character merging on the character segments to produce a plurality of merged character segments;
performing character recognition on the merged character segments to produce a plurality of recognized characters;
performing one or more translations on the recognized characters of the first language into one or more translated words of the second language; and
displaying the translated words of the second language in augmented reality in the real-time video feed.

20. A non-transitory, computer-readable digital storage medium for storing program code for translating a real-time video feed from a first language to a second language, the program code when executed by a processor causes the processor to execute a process comprising steps of:
providing an interface for selecting a vertical language text translation box corresponding to one or more words in the first language, wherein the first language is an Asian language comprising a plurality of characters having a vertical alignment;

cropping a frame of the real-time video feed of the one or more words of the first language to fit inside the vertical language text translation box to produce a cropped frame;

performing character segment detection on the cropped frame to produce a plurality character segments;

performing character merging on the character segments to produce a plurality of merged character segments;

performing character recognition on the merged character segments to produce a plurality of recognized characters;

performing one or more translations on the recognized characters of the first language into one or more translated words of the second language; and displaying the translated words of the second language in augmented reality in the real-time video feed.

21. The non-transitory, computer-readable digital storage medium of claim 20, wherein the step of performing the character merging further comprises additional steps of:

performing vertical and/or horizontal merging on the character segments with recognition feedback to produce the plurality of merged character segments.

22. The non-transitory, computer-readable digital storage medium of claim 20, wherein the step of performing the character recognition further comprises additional steps of:

calculating a recognition distance score for at least one merged character segment; and combining the recognition distance score and a shape score into a combined score for the at least one merged character segment to produce a recognized character with a high combined score.

23. The non-transitory, computer-readable digital storage medium of claim 20, wherein the step of performing the one or more translations further comprises additional steps of:

processing the recognized characters through a translation engine to produce the one or more translations of the recognized characters in the first language into the one or more translated words of the second language, while calculating a translation engine score representing how many and/or how well characters have been translated.

24. The non-transitory, computer-readable digital storage medium of claim 20, wherein the first language is selected from the group consisting of Chinese, Korean, Japanese, Vietnamese, Khmer, Lao, and Thai.

25. The non-transitory, computer-readable digital storage medium of claim 20, wherein the first language is selected from the group consisting of Chinese and Japanese, and the second language is English.

26. The non-transitory, computer-readable digital storage medium of claim 20, wherein the second language is selected from the group consisting of English, French, Spanish, German, Italian, Portuguese, Russian, Hindi, Greek, Hebrew, Arabic, Chinese, Korean, Japanese, Vietnamese, Khmer, Lao, and Thai.

27. The non-transitory, computer-readable digital storage medium of claim 20, further comprising additional program code when executed by the processor causes the processor to execute additional steps of:

moving the one or more translated words of the second language when a mobile device is moved without recalculating the one or more translations.

28. The non-transitory, computer-readable digital storage medium of claim 20, further comprising additional program code when executed by the processor causes the processor to execute additional steps of:

displaying a phonetic pronunciation of the one or more words of the first language being translated.

29. The non-transitory, computer-readable digital storage medium of claim 20, wherein a translated text having a highest translation quality is selected for display, and wherein the translation quality is determined by how many and/or how well the one or more words of the first language are translated.

30. The non-transitory, computer-readable digital storage medium of claim 20, wherein the step of performing character merging on the character segments to produce the plurality of merged character segments further comprises additional steps of:

determining at least a shape score for at least one merged character segment; and utilizing at least the shape score of the at least one merged character segment to produce the plurality of recognized characters with high shape scores.

\* \* \* \* \*